(12) United States Patent
Shields et al.

(10) Patent No.: US 6,960,779 B2
(45) Date of Patent: Nov. 1, 2005

(54) PHOTON SOURCE AND METHOD OF OPERATING A PHOTON SOURCE

(75) Inventors: Andrew James Shields, Cambridge (GB); Richard Mark Stevenson, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 146 days.

(21) Appl. No.: 10/384,597

(22) Filed: Mar. 11, 2003

(65) Prior Publication Data

US 2003/0218143 A1 Nov. 27, 2003

(30) Foreign Application Priority Data

Mar. 11, 2002 (GB) .............................. 0205664

(51) Int. Cl.$^7$ .............................................. H01L 33/00
(52) U.S. Cl. ............................ 257/13; 257/17; 257/21; 257/97; 372/45; 372/92
(58) Field of Search ............................ 257/13, 21, 17, 257/97; 372/45, 92

(56) References Cited

U.S. PATENT DOCUMENTS

| | | | | |
|---|---|---|---|---|
| 6,728,281 B1 | * | 4/2004 | Santori et al. ................. | 372/45 |
| 6,787,794 B2 | * | 9/2004 | Cain et al. ..................... | 257/20 |
| 2002/0190249 A1 | * | 12/2002 | Williams et al. ............... | 257/14 |

FOREIGN PATENT DOCUMENTS

WO  WO 02/056238  7/2002

OTHER PUBLICATIONS

Chen et al, "Nondegenerate . . . Biexcitons" QELS 2001, pp. 34–35.*
I. Robert, et al., Physica E, vol. 13, No. 24., pp. 606–609, "Tailoring Photon Emission Statistics of a Single Quantum Box for Quantum Communications", Mar. 2002.

E. Moreau, et al., Physical Review letters, vol. 87, No. 18, pp. 183601–1–183601–4, "Quantum Cascade of Photons in Semiconductor Quantum Dots", Oct. 29, 2001.

G. Chen, et al., Science, vol. 289, pp. 1906–1909, "Optically Induced Entanglement of Excitons in a Single Quantum Dot", Sep. 15, 2000.

A. K. Ekert, et al., Physical Review Letters, vol. 67, No. 6, pp. 661–663, "Quantum Cryptography Based on Bell's Theorem", Aug. 5, 1991.

A. Aspect, et al., Physical Review Letters, vol. 49, No. 2, pp. 91–94, "Experimental Realization of Einstein–Podolsky–Rosen–Bohm *Gedankenexperiment*: A New Violation of Bell's Inequalities", Jul. 12, 1982.

O. Benson, et al., Physical Review Letters, vol. 84, No. 11, pp. 2513–2516, "Regulated and Entangled Photons from a Single Quantum Dot", Mar. 13, 2000.

M. Bayer, et al., Physica E, vol. 12, pp. 900–903, "Entangled Exciton States in Quantum Dot Molecules", Jan. 2002.

O. Gywat, et al., Physical Review B, vol. 65, pp. 205329–1–205329–5, "BiExcitons in Coupled Dots as a Source of Entangled Photons", May 2, 2002.

* cited by examiner

*Primary Examiner*—Jerome Jackson
(74) *Attorney, Agent, or Firm*—Oblon, Spivak, McClelland, Maier & Neustadt, P.C.

(57) ABSTRACT

A photon source for emitting entangled photons, the source comprising:
  at least one quantum dot having a degenerate exciton level; and
  exciton creation means to create a biexciton or higher order exciton within the at least one quantum dot.

23 Claims, 25 Drawing Sheets

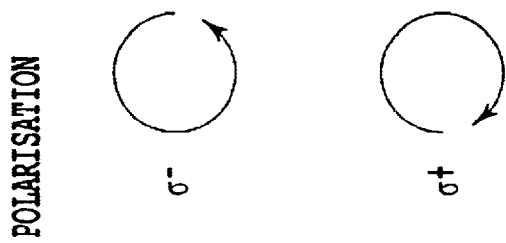
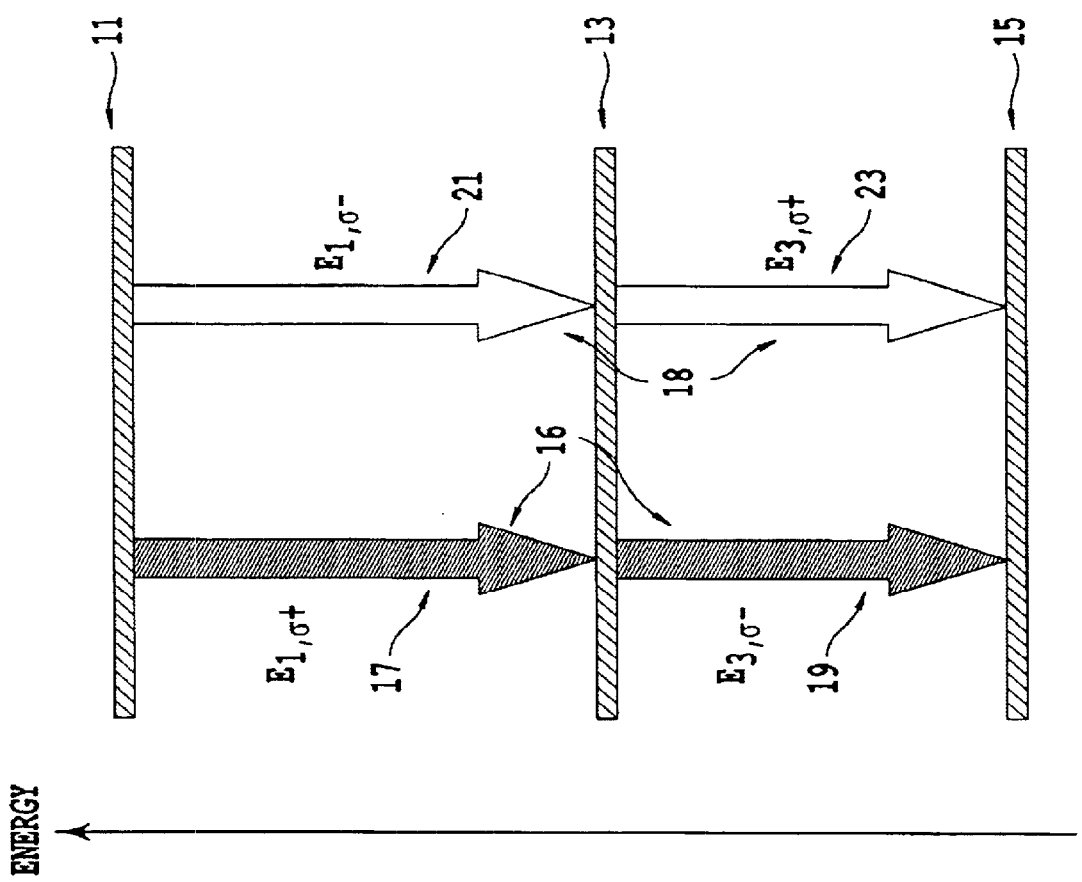
Fig. 2

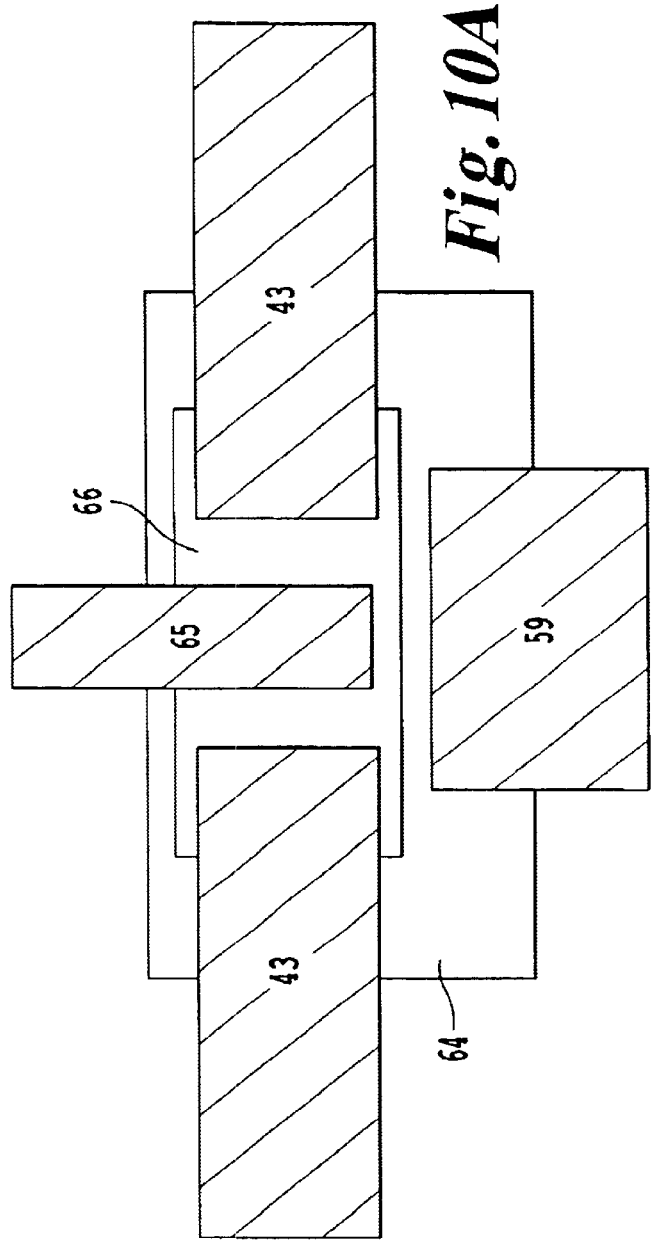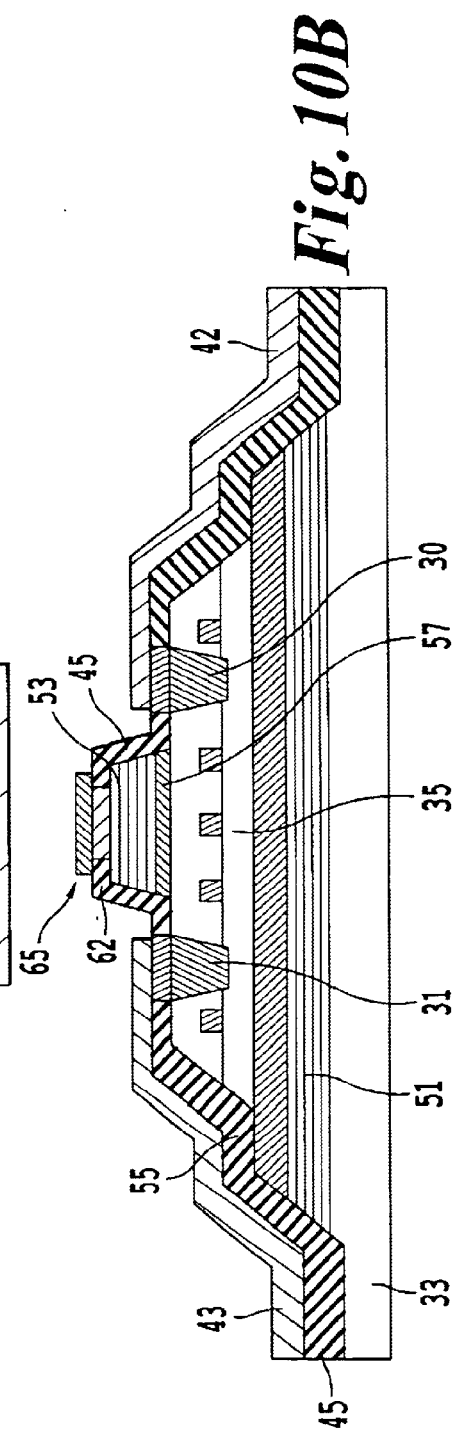

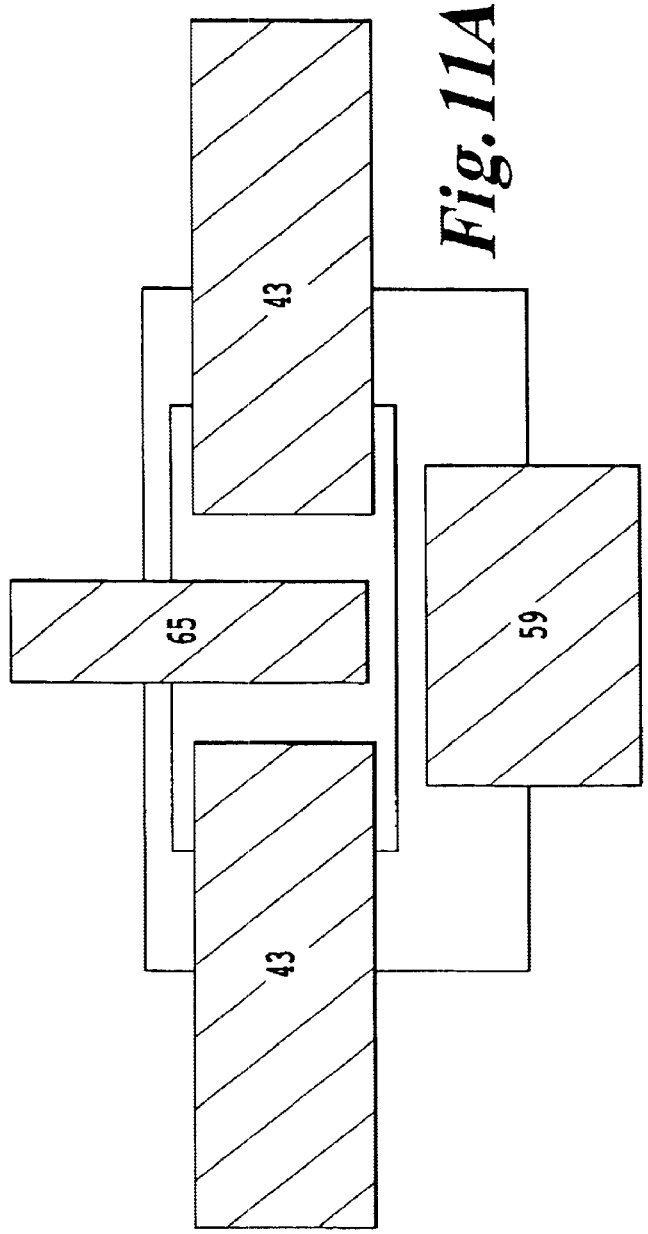
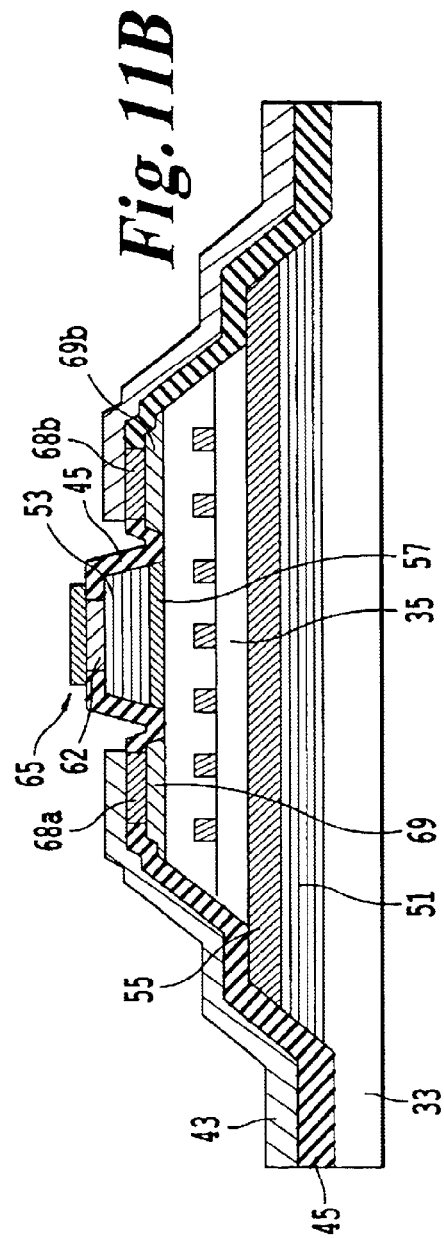

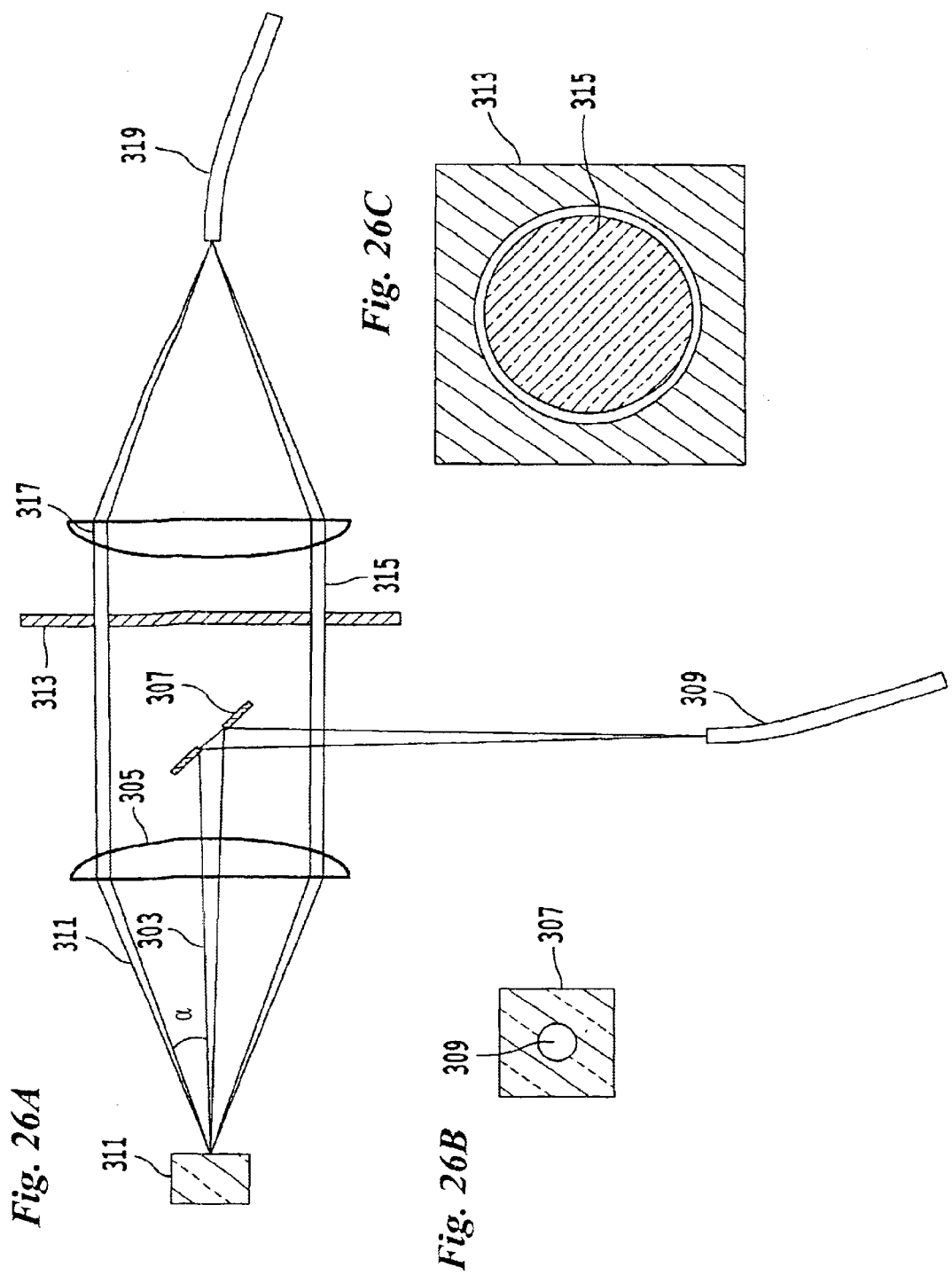

PHOTON SOURCE AND METHOD OF OPERATING A PHOTON SOURCE

FIELD OF THE INVENTION

The present invention is concerned with a photon source. More particularly, the present invention is concerned with the field of photon sources that can emit entangled photons.

BACKGROUND OF THE INVENTION

The relationship of one quantum parameter such as polarisation, phase, etc. between photons in an entangled photon pair is fixed, although the quantum parameter for a single photon is not defined until it is measured. For example, a photon pair entangled by polarisation may emit two photons of the same or opposite polarisation. By measuring the polarisation of one of the photons in any given basis, the polarisation of the second photon becomes defined in the same basis. Thus, the polarisation of either photon is not fixed until the polarisation of one of the photons is measured.

Entangled photon pairs have been found to be particularly useful in the field of quantum cryptography. In quantum cryptography, a key may be sent by randomly varying a quantum parameter of a sequence of photons.

In the quantum key distribution protocol described by A. K. Ekert in "Quantum Cryptography Based on Bell's Theorem" Phys. Rev. Lett. 67, 661 (1991), a single source is used to send one photon of the entangled photon pair to a receiver "Alice" and the other state to receiver "Bob". If a key is transmitted to both Alice and Bob, Alice knows what Bob has measured since Alice's measurements actually fix the state received by Bob. However, if an eavesdropper "Eve" intercepts the photon on the way to Alice, the entanglement of the two photons is destroyed. Alice and Bob can test whether their photons are entangled or not, by making a Bell state measurement, as described in the paper by Ekert.

Entangled pairs of photons may be produced using spontaneous parametric down conversion in a non-linear optical crystal, as described by A. Aspect et al, Phys. Rev. Lett. 49 91 (1982). However, this technique has the disadvantages of requiring a relatively expensive laser system and cumbersome alignment of the laser, crystal and collection optics. Furthermore, there is a significant probability of generating two entangled pairs simultaneously, which limits the usefulness of such a source.

Another approach to producing polarisation entangled photons pairs based upon semiconductor quantum dots has been proposed by O. Benson et al in "Regulated and Entangled Photons from a Single Quantum Dot", Phys. Rev. Lett. 84, 2513 (2000). A quantum dot which is excited so that it contains two electrons and two holes is said to be in the biexciton state. The quantum dot returns to the ground state by successive emission of a first photon, which occurs when the biexciton state decays to a single exciton state, and then a second photon, which occurs due to decay of the single exciton state. According to O. Benson et al, the first and second photons will have polarisation entangled states.

However, the applicant has found that for real quantum dots, the first and second photons are not entangled.

As explained above, in the biexciton state, a quantum dot comprises two electrons and two holes. The two electrons have opposite spins and the two holes have opposite spins.

A photon is only emitted if an electron and a hole radiatively recombine. For radiative recombination, the z-component of the total win angular momentum of the recombining electron and hole must be equal to +1 or −1. Thus a $S_z=+1/2$ electron can recombine with a $J_z=-3/2$ heavy hole to produce a σ− circularly polarised photons, while a $S_z=-1/2$ electron can recombine with a $J_z=+3/2$ heavy hole to emit a σ+ circularly polarised photon.

Thus, there are two paths by which the bi-exciton state can decay to the ground state dependent on which electron hole pair recombine first. These two possible decay paths are equally probable and are only distinguishable from each other by a single property, the polarisation of the emitted photons. Thus, the quantum mechanical description of the first and second photons is a superposition of the two possible outcomes until the polarisation of one of the photons is measured, at which time the decay path that was taken is determined and the polarisation of the second photon also becomes well defined.

The above process is only believed to happen if the single exciton level is degenerate, i.e. the energy separation between the single exciton level and biexciton level is the same regardless of the decay path.

In the device described by Benson et al., as no care is taken to ensure degeneracy of the exciton level, the single exciton level of the quantum dot is believed by the applicant to be a split non degenerate level.

SUMMARY OF THE INVENTION

Thus, in a first aspect, the present invention provides a photon source for emitting an entangled photon pair, the source comprising at least one quantum dot having a degenerate exciton level; and exciton creation means for creating a biexciton or higher order exciton within said quantum dot.

A degenerate exciton level will be formed if the quantum dot has four fold rotational symmetry. However, in practice, quantum dots are believed to be asymmetric.

In an asymmetric quantum dot the energy is slightly different for each of the two single excitons that arise from decay of the biexciton. Thus, the energies of the first and second photons in one possible decay path are different to the energies of the corresponding photons in the other decay path.

However, even in an asymmetric dot, it is possible to make the energy levels degenerate by providing some external influence. Therefore, the photon source will preferably comprise first means configured to make a non-degenerate exciton level degenerate.

Such first means may comprise means to apply an electric field across the quantum dot. The means being configured to apply a field that results in the single exciton level becoming degenerate or effectively degenerate. Effectively degenerate means that the two bright exciton energies are nearly equal and an entangled photon pair is emitted if a biexciton is created within the quantum dot.

An applied electric field causes the relocation of the electron and hole wavefunctions within the quantum dot. Localisation of the electron and hole wavefunctions to the opposite sides of the quantum dot means that the exciton energy is reduced. This change in exciton energy is termed the Stark shift. The Stark shift will be different for each of the single 'bright' exciton states. Thus, there are values of the applied electric field which will cause the bright single exciton levels to be degenerate.

The electric field may be applied by at least one ohmic contact, or Schottky contact. The potential applied to the at least one electrical contact is preferably controlled independently of any other potential applied to the photon source. The at least one quantum dot will generally be provided within a layer of quantum dots. The field may be applied with components either parallel or perpendicular to the layer.

The field may be preferably be provided by contacts located on either side of the at least one quantum dot. It is also possible to apply a field in any direction through the dot. The preferred method for this is by using three pairs of contacts. Preferably, the axis of each pair of contacts is orthogonal to the axes of the other two pairs of contacts.

The first means may also comprise a source of a magnetic field or means for applying a magnetic field across the said at least one quantum dot.

The Zeeman effect, associated with the interaction of spin polarised particles with a magnetic field, results in a change in the energy splitting of the two bright exciton levels as a function of applied magnetic field. Thus, the bright exciton levels may be made degenerate by applying a suitable magnetic field.

The magnetic field may be placed parallel or perpendicular to the layer which contains the at least one quantum dot.

The source of a magnetic field or means for applying a magnetic field may comprise a solenoid coil placed external to the body of the photon source, the axis of the coil being oriented normal to the plane of the dot layer. Typically, a field of from 0.1 T to 2 T is required and more preferably about 0.4 T.

The source of a magnetic field or means for applying a magnetic field may also comprise two solenoids spaced apart, having parallel axes, the plane of the dot layer being parallel to the axis. A field of about 0.5 T to 1.5 T is required to induce a sufficient shift of the bright exciton levels, more preferably about 1 T.

The source of a magnetic field or means for applying a magnetic field may also comprise an electromagnet, the body of said photon source being provided between the poles of said magnet.

Also, source of a magnetic field or the means for applying a magnetic field may comprise a conducting or superconducting track or loop provided on the surface of the photon source body, within the photon source or close to the photon source. The superconducting or conducting track or loop may be integrally fabricated with the device.

The first means may also comprise means for varying the pressure applied to the photon source body. Varying the pressure will cause variations in the internal strain of the photon source body. These variations, can be used to force the two blight exciton levels to become degenerate.

Preferably, strain is induced along a direction in the said quantum dot layer.

The first means may also comprise means to vary the temperature of the photon source body. This is because thermal expansion of the photon source body affects distribution of strain across the quantum dot and hence can force the two bright energy levels to become degenerate. This means could comprise a heater, or a thermoelectric cooler.

It is also possible to produce entangled photon pairs, or even an entangled multiplet, using states of the quantum dot other than the biexciton state. For example a state of the quantum dot which involves more than two electrons and/or more than two holes may be used. We use the general term, 'higher order exciton' to refer to a state with two or more electrons and two or more holes.

The dot may also produce pairs of photons whose linear polarisation states are entangled.

The exciton creation means may comprise incident radiation which is configured to provide two or more electrons and two or more holes within the conduction band and valence band of the quantum dot respectively.

The photon source will generally comprise barrier material. Said barrier material, having a higher band gap than the at least one quantum dot.

The energy of the incident radiation may be configured such that electron and hole pairs are generated in the surrounding barrier material to the quantum dot. The electrons and holes created in the barrier material thus have higher energy than the confined conduction and valence band levels of the quantum dot. Also, these electrons and holes are spatially separated from the quantum dot. These higher energy electrons and holes diffuse to the region of the at least one quantum dot and are captured by a quantum dot. The electrons and holes then relax into the lowest possible energy configuration in a time that is usually very much shorter than the radiative recombination time. Thus, photoexcited excitons in the quantum dot are considered to exist in their lowest energy configuration. Preferably, means are provided to aid diffusion of photo excited carriers into the at least one quantum dot.

The energy of the radiation may also be configured so that electrons and holes are excited directly in the quantum dot material. Due to the nature of the electron and hole levels in the quantum dot, it is generally only possible to resonantly excite one electron and bole pair for a given radiation energy. Therefore to resonantly excite at least two electrons and holes, the bandwidth and energy of the radiation must be configured so that the absorption of a second photon is possible.

Preferably, the incident radiation is pulsed, such that the body of the photon source is irradiated with short pulses of light. The pulse duration is preferably much less than the radiative lifetime of the biexciton or higher order exciton initially created. The time between pulses of light is preferably periodic, and is longer than the time required for the radiative decay processes that generates the entangled photon pair to occur. For example, if the initial state is that of the biexciton, then the time between excitation bursts must be longer than the sum of the radiative lifetimes of the biexciton, and single exciton state. This is to prevent the re-excitation of the quantum dot before the entangled photon pair has been emitted.

The exciton creating means may also comprise electrical injection means to supply electrons and holes to the at least one quantum dot. The electrical injection means preferably comprises electron and hole injecting layers.

The electron and hole injecting layers may comprise n-type and p-type doped semiconductors. For example, the at least one quantum dot may be arranged in the intrinsic region of a p-i-n junction. A voltage may be applied between the n and p type layers to inject electrons and holes into the at least one quantum dot. In order to excite the biexciton state, preferably the level of the applied voltage is controlled so as to inject two electrons and two holes to the quantum dot. Higher order exciton states may be excited using larger applied voltages.

It is possible to configure the electrically driven device so that photons are emitted from a single quantum dot at regulated times or on demand.

Preferably, the applied voltage is a pulsed voltage which switches between a first level where carriers are not injected into quantum dots and a second level where carriers may be injected into quantum dots. The length of time when the bias is at the second level should preferably be less than the radiative lifetime of the biexciton or higher order exciton initially created. The period of the pulsed voltage determines the period between photon emissions. It should be longer than the time required for the radiative decay processes that generates the entangled photon pair to occur. For example, if the initial state is that of the biexciton, then the time between excitation bursts should be longer than the sum of the radiative lifetimes of the biexciton, and single exciton state. This is to prevent the re-excitation of the quantum dot before the entangled photon pair has been emitted.

In order to remove photons from the output of the source which arise due to other unwanted radiative transitions within the body of the photon source, the photon source preferably comprises filter means configured to only pass photons having the desired wavelength.

Often it is convenient to prepare a device with more than one quantum dot. A plurality of quantum dots may possess different transition energies due to fluctuations in their size or composition. In this case, the emission from a single quantum dot may be isolated by filtering the wavelengths of the emitted light. By allowing only the light in a narrow bandpass to pass, it is possible to collect the emission of a single dot and exclude that of the others. However, two transitions from the same dot must be isolated, or only one of the photons in the entangled pair will be isolated.

Thus, the filter means is configured to pass two energies or a band of energies.

Such a filter means may comprise a dispersive element, such as a grating or prism spectrometer, which is configured to pass both wavelengths of the entangled photon pair. Alternatively the filter means may comprise an interference type filter, which allows dual wavelength bandpass. The filter means may also comprise two reflective filters. The first filter is configured to transmit one of the photons in an entangled photon pair, and reflect other photons towards the second filter. The second filter is configures to transmit the second photon in an entangled photon pair, and reflect other photons.

The energy separation of photons emitted by different dots may be larger than the energy separation of the two photons within the entangled photon pair from the same dot. To address this issue, the bandpass filter is preferably configured to isolate both the photons in a pair.

Preferably, the area of the source from which light is collected contains at most 10 quantum dots, so that the above method of filtering may be implemented.

In addition to photons arising from transitions within the quantum dot, there is likely to be spurious emission from other parts of the photon source. These spurious emissions may also be blocked by the filter means.

The filter means may also be integral with the photon source body, for example, the filter means may be provided by an interference filter on said source body.

The filter means need not necessarily be incorporated with the device or close to the photon source body. It may also be provided in a transmission system or even in a detection system.

The filter means may also be tuneable in wavelength and thus can allow different quantum dots within the source to be utilised.

The filtering means may also be configured to pass emission from a plurality of quantum dots. For example, these dots may emit at different wavelengths and thus the filter means can be designed to allow more than one wavelength to pass, either through a widened bandpass or through multiple, distinct bandpasses. This could be used to form a wavelength multiplexed entangled photon source.

Alternatively, it is possible to optically selectively excite a single quantum dot by using a laser with a narrow wavelength spectrum. The laser will excite only the quantum dot with the appropriate transition energy. However, as mentioned above, it must also be possible for the quantum dot to absorb a second photon.

In devices with more than one quantum dot, it is possible to change the quantum dot from which light is collected by changing the wavelength bandpass energy or the laser energy.

To use the source for quantum communication it is necessary to separate the two entangled photons such that the first photon is sent to a first receiver and a second photon is send to a second receiver. Therefore, the source preferably comprises separating means to separate the two photons which arise due to the biexciton or higher order exciton decay. One of the two photons may be directed along a first trajectory and the other of the two photons along a second trajectory. The first and second trajectories are spatially distinct to allow the photons to be directed into different optical transmission systems which may be provided by lenses, fibre optic cables or the like.

The two photons will have different energies, may have different polarisations, and will be emitted at slightly different times by the source. The separating means may comprise means to separate the photons by using time, e.g. a time gated switch or energy e.g. a dichroic mirror, or dispersive element such as a prism or grating, or polarisation by using a birefringent element The separating means may be provided distinct from the filtering means. Typically, the separating means will be provided before the filtering means. Thus, the output from the photon source body is separated by a separating means which is configured to distinguish between the two photons of an entangled pair, and then one photon is directed into a first filter means and the other photon is directed into a second filter means. The two filter means being any of the above previously described filter means.

For example, the separating means may be a dichroic mirror or the like, configured to direct photons having less than a predefined energy into the first filter means and photons having an energy larger than the predefined energy into the second filter means, where the predefined energy lies between that of a photon emitted due to single exciton decay and a photon emitted from biexciton decay.

Also, since a single quantum dot will emit a photon due to biexciton decay before it emits a photon due to single exciton decay, the separating means may direct photons which arrive at one time into one of the filter means and at another time into the other of the filtering means. The filter means then filter out photons due to radiative transitions in other dots or elsewhere in the photon source body.

The separating means may also act as the filter means. For example, if the filter means is provided by successive reflective filters, the filters may be oriented such that the two photons arising from biexciton decay are spatially separated.

Once the photons are emitted from the quantum dot, they can be collected by an optical fibre. Preferably, the device is provided with a coupling means to allow the photons to be efficiently collected by a fibre optic cable. Such coupling means may comprise antireflection coating located on the surface of the device through which the emitted photons are collected. An antireflection coating can be located on the optical fibre also.

The coupling means may also comprise a lens to collect emitted photons.

A particularly preferable arrangement of the device is achieved if the source has a mirror cavity which has two mirrors located on opposing sides of the quantum dot. Preferably, one of the mirrors (ideally the mirror closest the output surface) is partially reflective such that it can transmit the emitted photons. More preferably, the energy of the cavity mode for said mirror cavity is preferably substantially equal to that of the emitted photons. Further, it is preferable if the distance between the two mirrors $L_{cav}$ of the cavity is defined by $$L_{cav} = \frac{m\lambda}{2n_{cav}}$$

where m is an integer, $n_{cav}$ is the average refractive index of the cavity and $\lambda$ the emission wavelength (in vacuum).

The advantage of using a cavity is that it allows more of the emitted light to be coupled into the numerical aperture of the collecting fibre or optic. The cavity mode of the resonant cavity is emitted into a narrow range of angles around the normal to the mirrors. The fibre/collection optic is arranged to collect the cavity mode.

The resonant wavelength of the cavity can be chosen to be close to that of the desired transitions. Thus, the cavity may also act as a filter means.

The source will need to emit both the photon from the biexciton and the blight exciton, these will have slightly different energies. To address this problem, the bandwidth of the cavity mode is defined sufficiently large so that both photons can couple to the cavity mode. To make a cavity with a large bandwidth, relatively few repeats are required. For example, if the mirrors of the cavity are Bragg mirrors comprising alternating layers of AlAs and GaAs, a bandwidth of 2 meV can be achieved using less than 22 repeats. A bandwidth of 2 meV is believed to be sufficient to transit both photons emitted by the radiative decay of the biexciton state to the ground state.

Preferably a single mode cavity will be used, with a cavity mode bandwidth broad enough to include the energies of both photons of an entangled photon pair.

A single mode cavity requires optical confinement perpendicular to the plane of the quantum dot layer and within the plane of the quantum dot layer. Optical confinement within the plane of the quantum dot layers may preferably be provided by photonic band gap structure within the layer. A photonic band gap structure has a periodic variation in its refractive index in the two dimensions within the plane of the quantum dot layer. Optical confinement is achieved at an irregularity within the 2D pattern.

As an alternative to a wide band width cavity, a cavity with narrow bandwidth is chosen so that only the lowest energy photon, usually the exciton photon, corresponds to the low reflectivity region at normal incidence. Due to the dispersion of the cavity mode with in-plane wavevector, the energy corresponding to minimum reflectivity increases with angle of incidence, according to the following function:

$$E = E_0 \sqrt{\frac{n_{cav}^2}{n_{cav}^2 - \sin^2\theta}}$$

Where, E is the cavity mode energy at an angle $\theta$, and $E_0$ is the cavity mode energy at normal incidence. For typical separations of the exciton and biexciton line by a few meV, this translates to an angular separation of the emerging exciton and biexciton photons from such a device of around 10°.

Thus the cavity may also act as the separating means.

It should be noted that only the azimuthal angle to the normal to the plane of the cavity is defined for the photons, and the polar angle in the plane of the cavity is random. This means that photons resonant with the cavity mode for angles greater than 0°, for example 10° mentioned above, will be emitted along the sides of a cone. Thus one of the photons will be emitted along the sides of a core with a first predetermined azimuthal angle which defines a first optical mode and the other of said photons will be emitted along the sides of a core with a second predetermined azimuthal angle which defines a second optical mode. The predetermined angle will be 0° for photons resonant with the cavity. Thus for maximum efficiency, it is necessary to focus all these photons into a fibre.

At least one of the mirrors may be Bragg mirror comprising a plurality of alternating layers where each layer satisfies the relation:

$$n_a\, t_a \approx n_b\, t_b = \lambda/4$$

Where one dielectric layer (A) has a refractive index of $n_a$ and a thickness of $t_a$ and second dielectric layer (B) has a refractive index of $n_b$ and a thickness of $t_b$.

At least one of the mirrors may also comprise a metal layer. A phase matching layer should also be located between the cavity and the metal layer, so that an antinode is produced in the cavity mode at the interface between the cavity and phase matching layer. At least one of the mirrors may even be a semiconductor/air or semiconductor/dielectric interface.

A three dimensional cavity may also be provided by forming a photonic band gap structure within the plane of the layers of the two dimensional cavity, by the in-plane modulation of the refractive index, preferably by the etching of an array of holes The device has been described with one optical fibre. However, it will be appreciated that the device can be fabricated with more than one quantum dot emitting into more than one fibre or one quantum dot emitting into two fibres by use of the separating means.

A particularly preferable method for fabricating the quantum dot(s) of the present invention is by use of a self-assembling growth technique (such as the Stranskii Krastinow growth mode).

Typically, a thin layer of InAs, InGaAs or InAlAs with a thickness of preferably less than a few monolayers is grown overlying and in contact with a barrier material, typically GaAs, InGaAs, or AlGaAs. A capping layer is then grown overlying and in contact with the preceding layer, typically of the same material as the first barrier.

The areal density of the quantum dots is preferably less than $3 \times 10^7$ cm$^{-2}$.

In a second aspect, the present invention provides a method of operation of a photon source, said photon source comprising at least one quantum dot, the method comprising:

forcing the single exciton energy levels within the quantum dot to form a degenerate single exciton level;

forming a biexciton or higher order exciton within said at least one quantum dot.

BRIEF DESCRIPTION OF THE DRAWINGS

The present invention will now be described with reference to the following non-limiting embodiments, in which:

FIG. 2 is a schematic of the decay paths of a bi-exciton formed in a quantum dot having a degenerate bright exciton level;

FIG. 10a is a plan view of a device in accordance with a further embodiment of the present invention where the quantum dots are electrically excited, an electric field also being applied to force the bright exciton levels to be degenerate, FIG. 10b is a cross sectional view of the structure of FIG. 10a;

FIG. 11a is a plan view of a variation on the device of FIGS. 10a and 10b, FIG. 11b is a cross sectional view of device of FIG. 11a;

FIG. 12b is a cross sectional view of the device of FIG. 12a;

FIG. 14a is a side elevation of a device in accordance with a preferred embodiment of the present invention and FIG. 14b is a front elevation of the device of FIG. 14a;

FIG. 26 illustrates an experimental arrangement for obtaining and separating an entangled photon pair using an optical cavity.

DETAILED DESCRIPTION OF THE PREFERRED EMBODIMENTS

Figure 1:
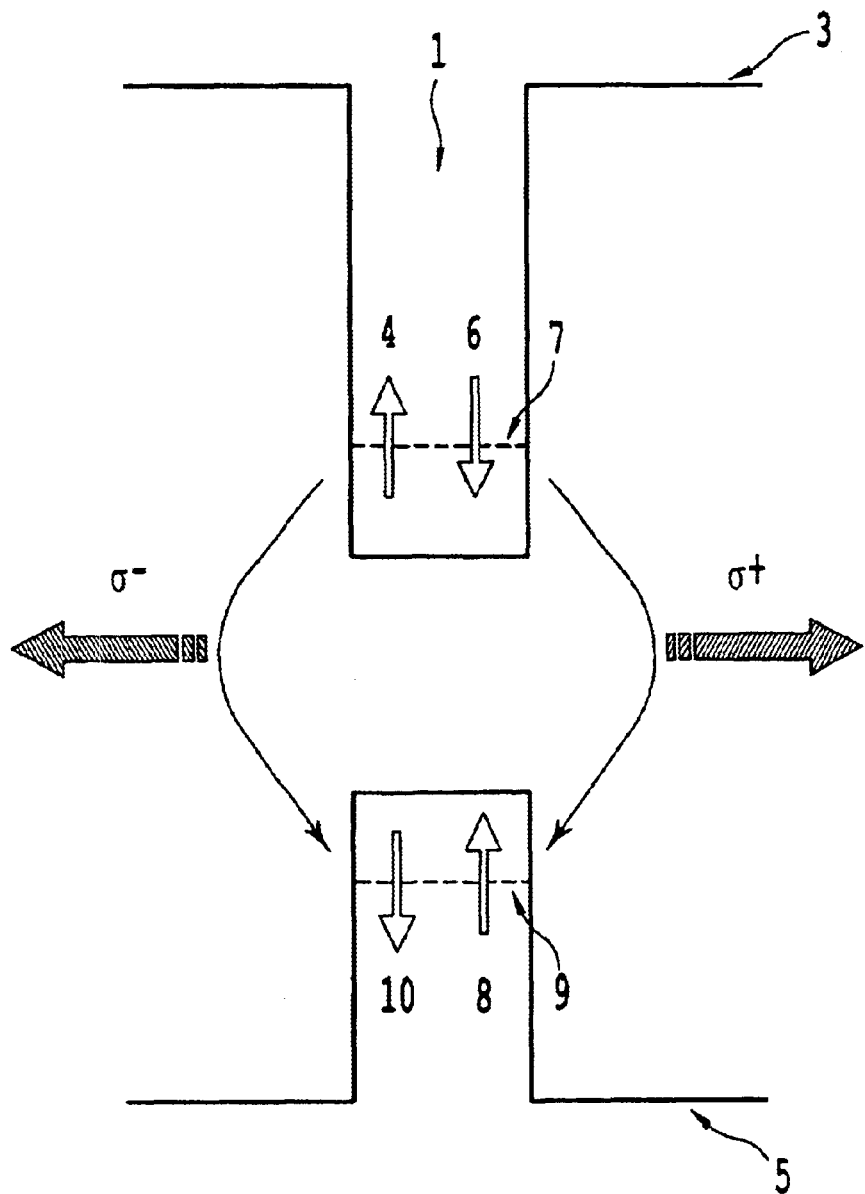
FIG. 1 is a schematic band structure of a quantum dot, populated with a bi-exciton.

FIG. 1 illustrates the energy band diagram of a single quantum dot. The quantum dot has a potential well 1 formed in both the conduction band 3 and valence band 5. A single confined conduction band level 7 is shown in the conduction band 3 and a single confined valence band level 9 is shown in the valence band.

The confined conduction band level is occupied by one spin up 4 and one spin down 6 electron. The spin up electron 4 has z component of $S_z=+1/2$, the spin down electron 6 has $S_z=-1/2$.

Similarly, the confined valence band level 9 is occupied by both a spin up 8 and spin down 10 hole. The spin up hole has a z component of the total angular momentum of $J_z=+3/2$, the spin down hole 10 has $J_z=-3/2$. An electron and a hole may recombine either radiatively where a photon is emitted or non-radiatively, where no photon is emitted.

Selection rules dictate that radiative recombination of an electron and hole pair is only permitted if the z-component of their total angular momentum is +1 or −1.

Only radiative recombination is of interest in the devices in accordance with embodiments of the preferred invention. After a first photon has been emitted due to radiative recombination of a single electron with a single hole, a (single) exciton state is formed in the dot. Since the remaining electron and hole will have spins of opposite sign, it can decay radiatively. This exciton radiatively decays to the ground state is possible, creating a second photon with the opposite circular polarisation to the first.

This type of (single) exciton, where radiative recombination is possible due to the spin configuration of the electron and hole is known as an optically active or 'bright' exciton state. If the z-component of the total angular momentum does not equal +1 or −1, radiative recombination is forbidden and the exciton is said to be optically inactive or "dark". Dark single excitons are not a product of biexciton decay.

FIG. 2 illustrates an energy level diagram of a single quantum dot with four fold rotational symmetry. The uppermost energy level 11 is the biexciton level, the middle energy level is the degenerate bright exciton level 13, and the lowest energy level is the ground state level 15.

Two decay paths of the biexciton level to the ground state are possible. In the fist path 18, a spin-up electron recombines with a spin down hole, then the remaining spin down electron recombines with a spin up hole. In the second path 16, a spin-down electron recombines with a spin up hole, then the remaining spin up electron recombines with a spin down hole.

In the first path 16, the first photon 17 is emitted at energy $E_1$, with clockwise circular polarisation $\sigma^+$, to return the quantum dot to the single bright exciton state.

The first photon is followed by the emission of a second photon 19, which has an energy $E_3$, which is in general different from $E_1$. The circular polarisation of the second photon is $\sigma^-$, the opposite to the first photon.

The second decay path 18 is similar, and the first and second photons emitted 21 and 23 have the same energies as photons 17 and 19. Their circular polarisations are however opposite.

The biexciton has a equal probability of following either the first decay path 16 or the second decay path 18. The only way to distinguish between the two decay paths of the biexciton is by the measurement of the polarisation of the emitted photons. Thus, the quantum mechanical description for the first and second photon emitted is a superposition of the two possible paths until one of the photons is measured. Thus, the quantum state describing the first photon is entangled with the quantum state describing the second photon.

Figure 3:
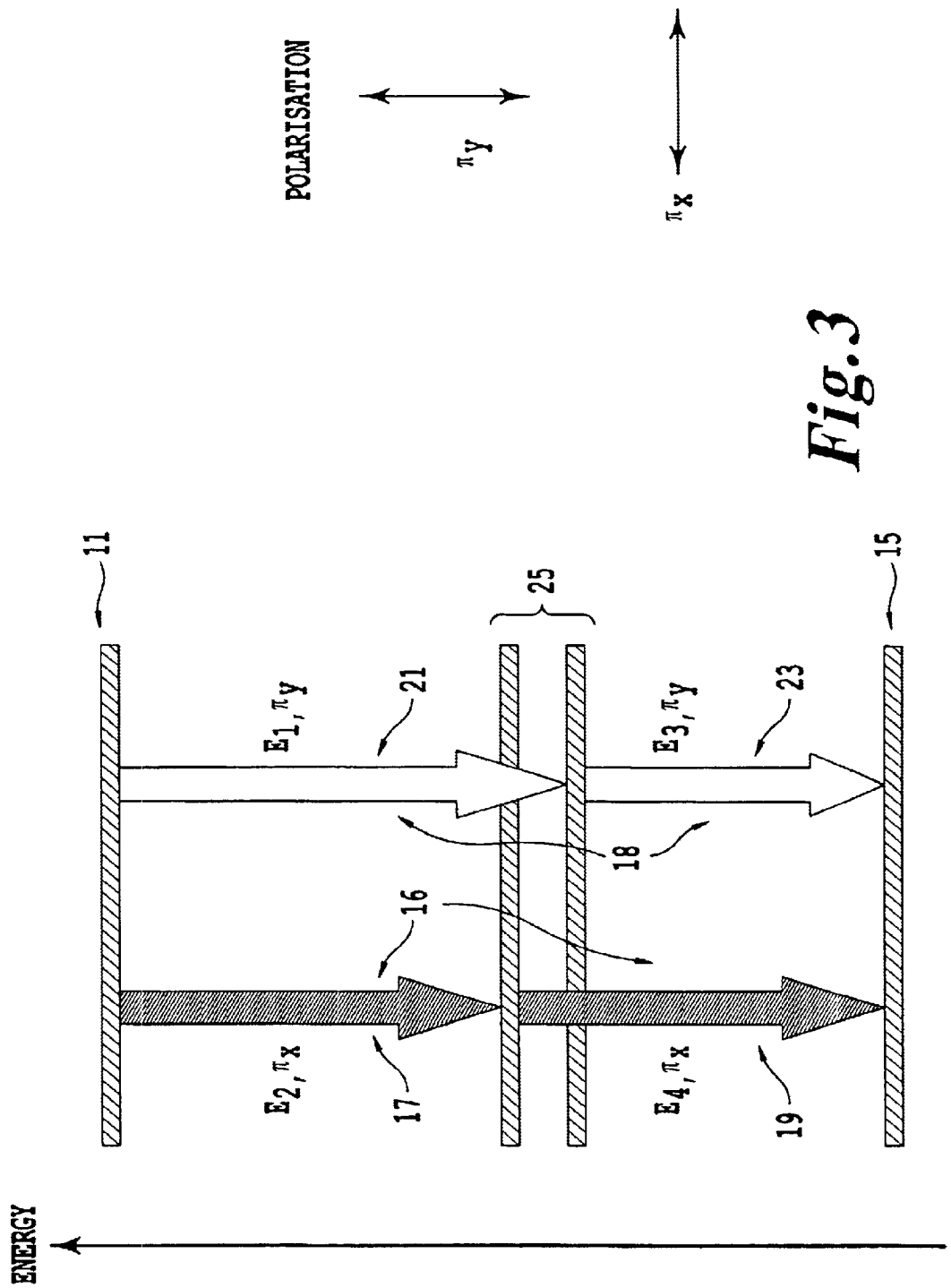
FIG. 3 is a schematic of the decay paths of a bi-exciton formed in a quantum dot having a non-degenerate bight exciton level.

FIG. 3 illustrates an energy level diagram similar to FIG. 2. Except, here, the bright exciton level is split non-degenerate level 25. This is a typical energy level diagram for a biexciton in a quantum dot which lacks fourfold symmetry.

The lack of four fold rotational symmetry leads to non-degenerate bright exciton levels 25. Also, the lack of symmetry means, results in the emission of all photons with linear, rather than circular, polarisation.

In addition, the energies of the first photons 17 and 21 in each decay path 16 and 18, have energies $E_2$ and $E_1$, that are no longer equal. Similarly for the second photons emitted 19 and 23 with different energies $E_4$ and $E_3$.

The photons emitted via the first path 16 are linearly polarised, with polarisation $\pi_x$, whereas the photons emitted via the second path are both emitted with the orthogonal linear polarisation $\pi_y$.

The pair of photons emitted by biexciton decay are of the same linear polarisation, rather than of opposite circular polarisation as in FIG. 2. Since the path taken can be deduced by measuring the energy of one of the photons as an alternative to measuring the polarisations, the photons emitted by this type of quantum dot are not entangled.

Thus, in order for the quantum dot whose energy levels are shown in FIG. 3 to emit entangled photons during bi-exciton decay, the split non-degenerate bright exciton level 25 needs to be made degenerate. A possible method for achieving this is by applying an electric field.

FIG. 4a illustrates a quantum dot which has a non-degenerate bright exciton level of the type described with reference to FIG. 3. The quantum dot has a potential well formed in both the conduction band 3 and valence band 5. To avoid unnecessary repetition, the same reference numerals used in FIG. 1 will be used to denote like features. An energy gap of $E_0$ is present between the confined valence 9 and conduction 7 band levels.

Application of an electric field F in any direction across the quantum dot, causes the conduction band 3 and valence band 5 become tilted as schematically illustrated in FIG. 4b. The electron and hole energy levels 7 and 9 become relocated in the deep part of the potential wells formed in the conduction and valence bands. This causes a reduction of the energy gap between the confined conduction and valence band levels to $E_F$ ($E_F<E_0$).

This effect is known as the quantum confined Stark effect, and in general the energy of an exciton in a potential well has a quadratic dependence with electric field at low field, turning linear at high field for which the wavefunction are localised against the potential barriers.

Figure 4:
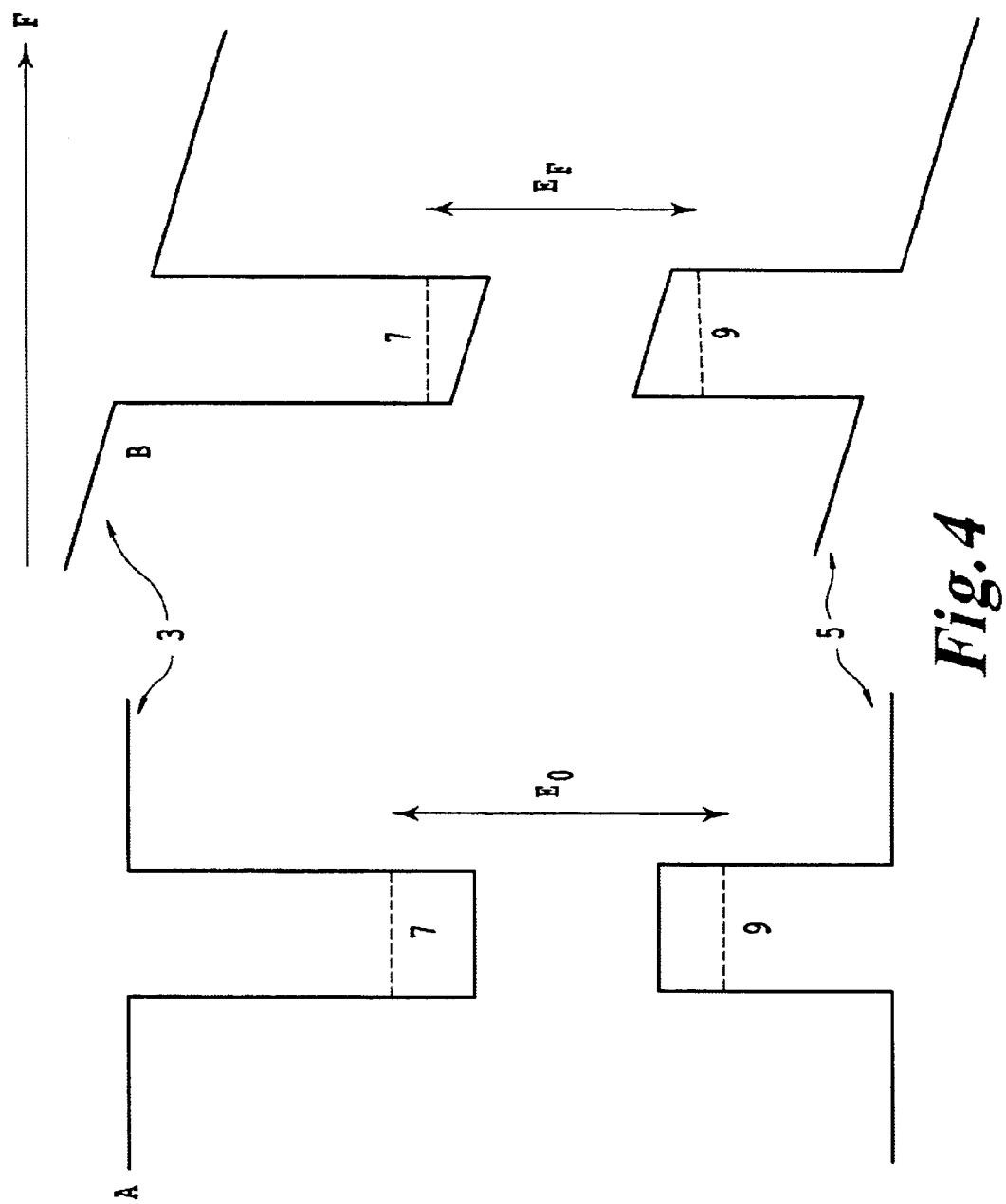
FIG. 4a is a schematic band structure of a quantum dot having a non-degenerate bright exciton level and FIG. 4b is a schematic of the band structure of FIG. 4a with an applied electric field sufficient to make the bright exciton level degenerate.

The magnitude of the field changed induced by the Stark effect will be different for the two bright excitons of FIG. 4. Thus, it is possible to use the Stark effect to force the previously split non-degenerate levels of FIG. 3 to be degenerate as shown in FIG. 2.

Figure 5:
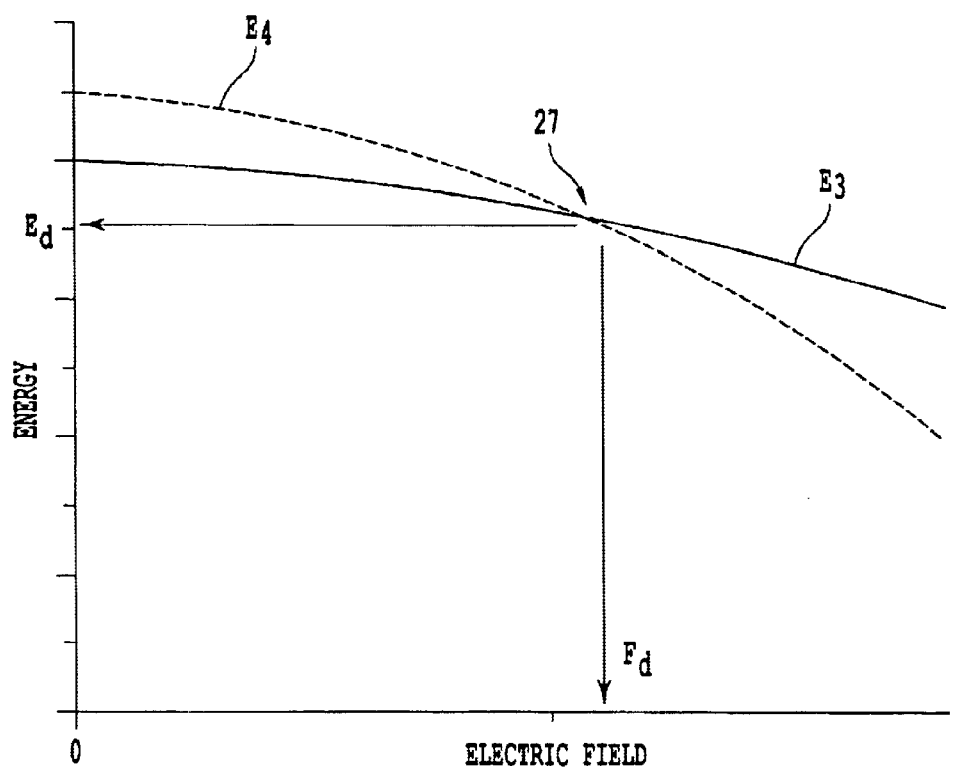
FIG. 5 is a plot of energy against applied electric field for the two bright exciton levels of a quantum dot.

FIG. 5 illustrates a plot of exciton energy against applied electric field for the two bright exciton levels $E_3$ and $E_4$ of FIG. 3.

Since the energies of the two bright exciton levels $E_3$ and $E_4$ shift differently with electric field, by choosing the appropriate direction and strength of the electric field it is possible to reach the intersection point 27, where the energies $E_3$ and E4 are equal. The bright exciton level would thus become degenerate, and since the biexciton and ground state energy levels are the same state for both decay paths. Thus, the energies of the photons emitted due to biexciton decay will be the same regardless of the decay path. Thus photon pairs which are entangled in their polarisation can be emitted due to biexciton decay.

Figure 6:
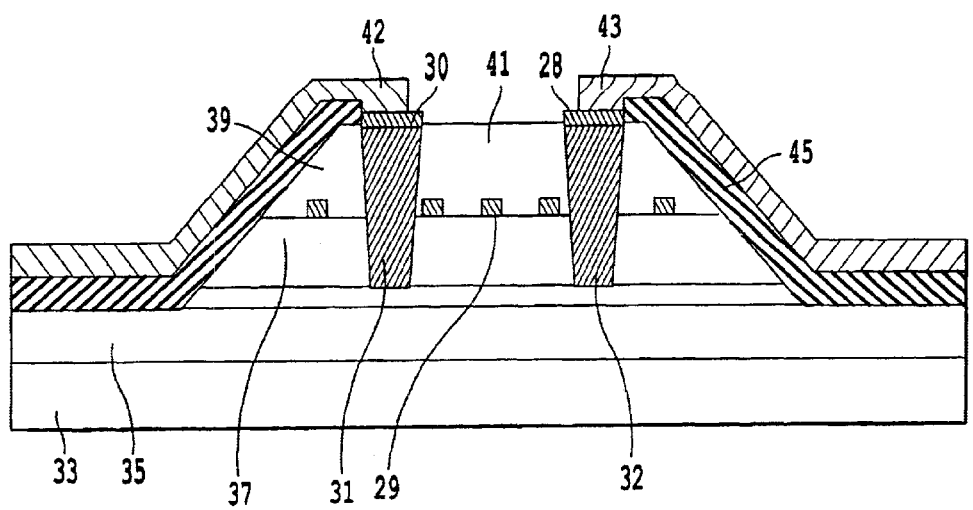
FIG. 6 is a device in accordance with an embodiment of the present invention where an electric field is applied in the plane of the layer of quantum dots.

FIG. 6 illustrates a device in accordance with a preferred embodiment of the present invention.

The device is formed by molecular beam epitaxy (MBE) on a semi-insulating GaAs substrate, though in general any epitaxial growth process can be used. A GaAs buffer layer 33 is formed overlying and in contact with a substrate (not shown). A first intrinsic layer 35 comprising 500 nm of undoped GaAs is formed overlying and in contact with said buffer layer 33. This layer may not be intentionally doped or may be lightly doped, n-type or p-type.

The buffer layer 33 and first intrinsic layer 35 were grown at a temperature of 600° C. The growth was then interrupted for 30 seconds and the substrate temperature was lowered to 500° C. An InAs quantum dot layer 37 was formed from approximately 2.0 monolayers of InAs. This layer may also be lightly doped. Due to the lattice mis-match between InAs and GaAs, the InAs grown by the Stranskii-Krastinow mechanism forms islands on the growth surface. After over growth these islands form quantum dots.

Typically, these quantum dots can be grown with a substrate temperature between 450 and 520° C. The thickness of the InAs layer should be in the region of 1.6 to 4 monolayers. More ideally it is in the range 1.8–2.4 monolayers. By controlling the amount of InAs deposited the quantum dots can optimised to emit at the desired wavelength.

A second intrinsic layer 39 comprising undoped GaAs is then formed overlying and in contact with the quantum dot layer 37. This layer may be grown at 500° C. Alternatively, the first 5 nanometers of this layer can be grown at this lower temperature and then the temperature may be raised to the original 600° C. growth temperature. In total this layer 39 is 200 nm thick. The layer may also be lightly doped.

On fabricating the structure, the number of quantum dots is reduced by etching a mesa structure on the wafer, as described below.

Side ohmic metal areas 28 and 30 are formed using standard photolithography techniques. The side ohmic metal may be an n-type ohmic contact, formed from Au:Ni:Ge alloy in the weight composition ratio of 88:12:1. However, other alloys and compositions are also possible. First a photo-resist is spun onto the device surface and exposed to UV light through an appropriate mask, so that after being developed the resist is removed from the contact regions of the surface. The n-type contact metal is then evaporated onto the surface. Following this it is annealed for 1 minute at a temperature of 430° C. in a reducing $N_2$—$H_2$ atmosphere, so that the contact can diffuse into the semiconductor layers to form penetrating contacts 31 and 32.

Alternatively p-type ohmic contacts could be fabricated instead of the preferred n-type contacts described.

The side metal contacts 28 and 30 may also be formed from a metal which makes a Schottky contact with the semiconductor. For example it may be formed by evaporating first a 10 mn thick layer of NiCr followed by 100 nm of Au. In this case there is no need to anneal the contact.

A mesa structure was then formed. Mesa 41 defines the area of the dot layer, and therefore the number of dots. In general the mesa area can be of any shape, including rectangular, square or circular. The mesa can have an area of up to 10000 $\mu m^2$. Preferably the mesa will have an area of less than 100 $\mu m^2$. Preferably the mesa will contain less than 10000 optically active quantum dots. More preferably it will contain less than 100 optically active quantum dots.

More preferably the mesa is made sufficiently small so as to support a single optical mode. This may be achieved with a mesa diameter of 1 $\mu m$.

The metal Ohmic contacts 30 and 28 should have a separation of between 0.1 and 100 microns. Preferably the separation will be around 5 microns.

The pattern of the mesa was defined using photoresist, the pattern of the photoresist and the type of photoresist was chosen such that after development, resist covered the surface of the mesa. The wafer was then wet-etched using a solution of $H_2SO_4$ (31%):$H_2O_2$(96%):$H_2O$ with a volume of 1:10:800. The etch depth is chosen so that it stops in undoped first GaAs layer 35.

Although the above etch is preferred, any etch solution which can etch GaAs can be used including different compositions of the above etch, or other mixtures such as $HCl:H_2O_2:H_2O$. Dry etching could also be used.

External electrical connections may then be made to the top of the mesa using a contact metal layer which leads to large area contact pads formed away from the mesa. To prevent the contact metal leads 42 and 43 from shorting to the exposed layers on the sides of the mesa, the metal contact leads 42 and 43 are provided overlying an insulating layer 45.

The insulating layer 45 is deposited by spinning a photo-imaginable organic compound onto the device, such as polyimide. This insulator can be processed in a similar manner to that of photoresist. The polyimide is cured by baking it on a hot plate at 115° C. for 900 seconds. The layer was then exposed to UV light through a chrome-on-glass mask. UV light cross-linked the polyimide so that when the layer was exposed and developed, only the unexposed areas of the polyimide are dissolved. The insulating layer is typically 500 nm thick.

A patterned metal NiCr/Au layer was formed over the insulator to provide the metal contact leads 42 and 43, this formed contact pads well away from the mesa. Although NiCr/Au is used, other metals may be used providing they can be adhered to the device and provide high electrical conductivity. The contact metal needs to be chemically inert to avoid degradation over time.

The above fabrication is a preferred example. Other techniques may be used or variations on the above are possible. The order of the processing steps may be varied dependent on the annealing temperatures of the n-type contacts.

This device started with a plurality of quantum dots. However, due to the formation of the mesa structure 41, only a few dots remain. To isolate a single quantum dot, the preferred method of spectral filtering will differentiate between photons emitted by different dots, which in general have different energies.

The side contacts, or the contact metal, may also be used to restrict the emissive area on the top of the device. In this case the separation of the Ohmic contacts should be of order 0.1–5 microns. The two side contacts should not touch, so as to avoid short circuit.

Alternatively, the side contacts may be formed overlying the insulator layer. In this case the procedure for forming the side contacts described above is omitted. The insulator layer is defined on the device, as described, except holes for the side contacts are not defined. The side contacts are defined overlying the insulating layer, in a similar manner to the contact metal described above. The side contacts in this case may be 10 nm NiCr followed by 200 nm Au. The advantage of this technique is that no current will be able to pass through the insulator layer to the side contacts.

The device thus comprises an optically excited quantum dot 29 arranged between two side penetrating contacts 31 and 32 that allow the application of an electric field in the plane of the device. The laser used to excite the recombining electron and holes is not shown here.

Operation of the device follows the principle of that described with reference to FIGS. 4 and 5. An electric field F is applied between penetrating contacts 31 and 32 by applying a potential difference between contact leads 42 and 43. Electron hole pairs are then optically excited in the mesa structure, preferably by using a focused beam of laser pulses. The energy of the laser is above that of the quantum dot emission, and is preferably above the energy of the GaAs bandgap, for example at 1.55 eV. The power of the laser is chosen so that the intensity in the exciton and biexciton photon emission lines from the quantum dot is close to saturation. This is typically in the region of 40 nW. The potential difference across contact leads 42 and 43 is then varied until there is no splitting of the exciton and biexciton emission lines, corresponding to a degenerate bright exciton level, as depicted in FIG. 5.

To use both entangled photons, it is desirable to separate the two photons. The first photon to be emitted during biexciton will have a different energy to the photon emitted due to decay of the subsequently formed bright exciton. Thus, the biexciton and exciton photon emitted by the device may be separated using a dichroic mirror, or alternatively by dispersing the emission. Since these two photons are emitted a slightly different times, it is also possible to use a time gated switch to separate the two photons.

Figure 7:
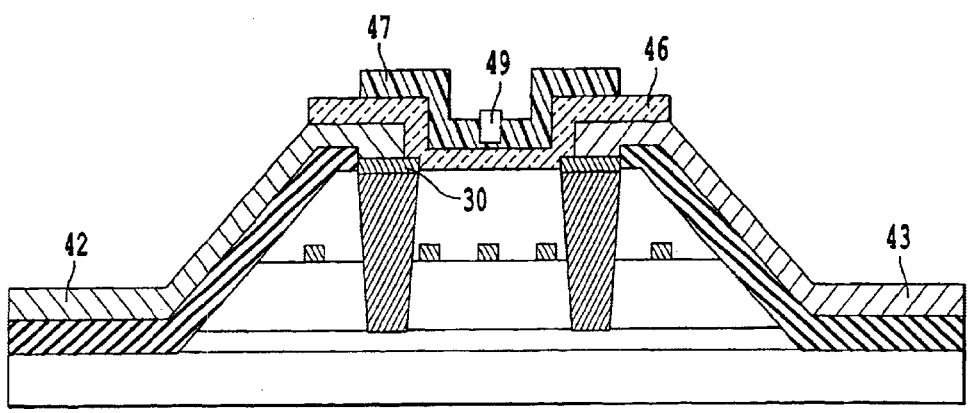
FIG. 7 is a variation on the device of FIG. 6 with a mask for collecting emission from a reduced number of quantum dots.

FIG. 7 describes a variation of FIG. 6, where in addition an opaque insulating mask 47 is deposited on the top of the mesa structure, and an aperture 49 is defined in this mask. The purpose of the mask is to isolate the emission from only the quantum dot directly beneath the aperture, by blocking photons emitted by other quantum dots within the mesa structure.

The mask 47 is manufactured as follows. Firstly a layer of transparent insulator 46 is defined on the surface of the device between the metal ohmic contacts. A thick opaque metal layer, such as Al, is then defined on top of the insulator, so that it does not make a short circuit between the metal ohmic contacts 28 and 30, or contact leads 42 and 43.

The insulator layer may also be omitted, provided that the area of the mask area is limited so that it does not make a short contact between the two side contacts. Alternatively an opaque insulating layer may be used as the mask layer.

As mentioned above, the Al layer is opaque to the light emitted by the dots. In order to allow emission from the device from either a single dot or a limited number of dots, a small emission aperture 49 must be formed in the mask.

Electron beam lithography is used to form windows of between 0.01 to 4 μm² in the mask. This is achieved by spinning on an electron beam lithography resist such as PMMA, defining the window using an electron beam, developing the resist and then etching using Shipley developer for AZ 1800 series photoresist. However, any wet or dry etcher that attacks Al but not GaAs or the etch mask can be used. For example, NaOH:$H_2O_2$:$H_2O$.

As an alternative to electron beam lithography, photo lithography may be used. For example, when the aluminium mask is formed after the mesa etch, the mask may be formed with a small aperture at its centre.

This device has a plurality of quantum dots. However, due to the formation of the opaque mask with its small emission aperture, only the dots directly underneath the emission aperture can emit photons, which are collected. These dots are referred to as the dots within the 'active region' of the device. Dots outside the active region may emit photons. However, these photons will be blocked by mask 47 and cannot contribute to the signal emitted from the device.

The diameter of aperture should be smaller than the average spacing between quantum dots. For quantum dot densities typical in the devices studied, this corresponds to a maximum aperture diameter of around 2 μm. It is also possible to use an array of apertures rather than a single aperture, provided they are well spaced enough for light predominately from a single quantum dot to emerge from each aperture. An array of apertures 1 μm in diameter, separated by 5 μm would be suitable for this purpose. Emission from only a single aperture is then isolated by using further spatial filtering means, for example projecting a magnified image of the aperture array onto a pinhole with diameter smaller than the spacing of apertures in the image.

Figure 8:
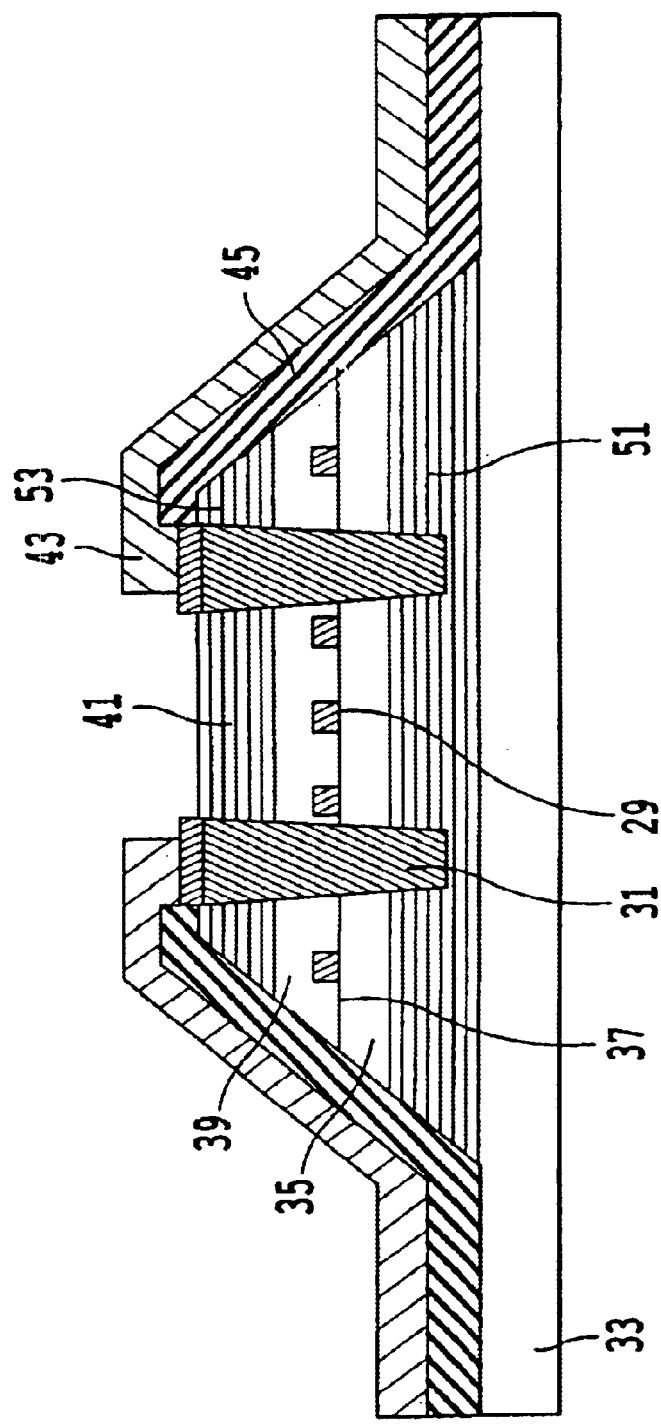
FIG. 8 is a variation of the device of FIG. 6 having a resonant optical cavity.

FIG. 8 shows a further device in accordance with an embodiment of the present invention. The device is similar to that of FIG. 6. To avoid unnecessary repetition, like reference numerals with FIG. 6 will be used to denote like features.

In the same manner as the device of FIG. 6, a GaAs buffer layer 33 is formed overlying and in contact with a semi-insulating GaAs substrate (not shown). A lower Bragg mirror 51 is then provided overlying and in contact with said buffer layer 33. Said lower Bragg mirror comprises 10 pairs of alternating layer of AlAs (110.04 nm) and GaAs (95.46 in). The GaAs and AlAs layers are nominally undoped.

A first intrinsic GaAs undoped layer 35 is then formed overlying and in contact with said lower Bragg mirror 51. The thickness of this layer is 188.9 nm. This layer may also be lightly doped, p or n-type.

An $In_xGa_{1-x}As$ undoped first barrier layer (not shown) having a thickness of 2 nm is then formed overlying and in contact with the first intrinsic layer 35. In this layer, x=0.3.

InAs dot layer 37 is then formed overlying and in contact with first barrier layer (not shown). Approximately 1.8 monolayers of InAs are used to form the dot layer.

A second barrier layer (not shown) comprising $In_xGa_{1-x}As$ layer is then formed overlying and in contact with said dot layer 37. This layer has a thickness of 2 nm and x is 0.3.

A second intrinsic GaAs undoped layer 39 is then formed overlying and in contact with second barrier layer (not shown). The width of this layer is 188.9 nm. This layer may also be lightly doped.

A second Bragg mirror 53 is grown overlying and in contact with second intrinsic layer 39. Upper Bragg mirror 53 comprises five pairs of alternating layers of AlAs (111.04 nm) and GaAs (95.46 nm). Both types of layers are nominally undoped. The processing for this device is identical to that described with reference to FIG. 2.

In the above structure, the dot layer 37 is provided within a one-dimensional optical cavity defined by lower Bragg mirror 51 and upper Bragg mirror 53. The cavity is designed to resonate close to a wavelength of 1300 nm.

The thickness of the Bragg reflector is chosen in order to make it highly reflective at the intended operational wavelength λ. The composition of each layer is chosen so that there is a high refractive index contrast. This can be achieved by alternating AlAs and GaAs layers.

The optical thickness of each pair of layers is chosen to be as close to λ/2 as possible. The optical length for each layer should be λ/4 for maximum reflectivity. The number of repeats increases the reflectivity and 5 to 20 pairs of layers should be sufficient for this device operation.

The layers between Bragg mirrors 51 and 53 form the cavity region. The total thickness of the cavity has been designated to be close to $\lambda/n_{cav}$ where $n_{cav}$ is the average refractive index of the cavity layer. The quantum dot layer 37 is placed at the antinode of the optical field, at the centre of the cavity region.

The quantum dot is located within a resonant cavity. This cavity also acts as a wavelength filter. This is because resonance condition $$L_{cav} = \frac{m\lambda}{2n_{cav}}$$

is satisfied for a narrow range of emission wavelengths. In the above equation, $L_{cav}$ is the width of the cavity, $n_{cav}$ is its refractive index, λ is the wavelength of the cavity mode in vacuum and m is an integer. Thus, if the wavelength of the cavity mode could be matched to the wavelength of the desired excitonic transitions, for example, the exciton and bi-exciton transition of the desired dot, this greatly suppresses the collection of other exciton lines from the same dot as well as emission from other dots under the region of the device.

Since the energy of the exciton and biexciton emission lines are slightly different, it is important for an entangled photon pair source that both can couple out of the device via the cavity mode. This can be achieved in two ways.

In the first method, the bandwidth of the cavity mode is sufficiently large so that the both the energy of the exciton and biexciton photon fall in the region of low reflectivity at normal incidence. This kind of cavity mode requires fewer repeats in the Bragg mirrors, and has the disadvantage that the suppression of photons from other quantum dots is not as strong.

In the second method, a cavity with narrow bandwidth is chosen so that only the lowest energy photon, usually the exciton photon, corresponds to the low reflectivity region at normal incidence. Due to the dispersion of the cavity mode with in-plane wavevector, the energy corresponding to minimum reflectivity increases with angle of incidence, according to the following function.

$$E = E_0 \sqrt{\frac{n_{cav}^2}{n_{cav}^2 - \sin^2\theta}}$$

Where, E is the cavity mode energy at an angle θ, and $E_0$ is the cavity mode energy at normal incidence. For typical separations of the exciton and biexciton line by a few meV, this translates to an angular separation of the emerging exciton and biexciton photons from such a device of around 10°.

Preferably the mesa is made sufficiently small so as to support a single optical mode. This may be achieved with a mesa diameter of 1 μm. In this case the thickness of the first intrinsic GaAs region and second intrinsic region are adjusted so that the frequency of the optical mode coincides with the emission wavelengths.

The upper and lower barrier layers (not shown) may be chosen in order to allow the dot to have the desired operating wavelength. In this example, x was chosen to be 0.3 to achieve this goal.

The source may also be fabricated from other material systems. For example, it is possible to form the device on an InP substrate, which is better suited for emission at longer wavelengths. In the following example, the optical cavity is designed for operation at 1.55 μm.

The device is formed in the same manner as described above, but the substrate is InP. Buffer layer 33, comprises $In_{0.52}Al_{0.48}As$. Lower Bragg mirror 51 comprises of 10 pairs of alternating layers of $Al_{0.1}Ga_{0.9}As_{0.5}Sb_{0.5}$ (99 nm) and $AlAs_{0.5}Sb_{0.5}$ (118 nm). First intrinsic layer 35 comprises 216 nm of undoped $In_{0.53}Ga_{0.47}As$. Dot layer 37 comprises 1.8 monolayers of InAs. Second intrinsic layer 39 comprises 216 nm of undoped $In_{0.53}Ga_{0.47}As$. Finally, the top DBR 53 comprises 5 pairs of alternating layers of undoped $Al_{0.1}Ga_{0.9}As_{0.5}Sb_{0.5}$ (99 nm) and $AlAs_{0.5}Sb_{0.5}$ (118 nm).

Figure 9:
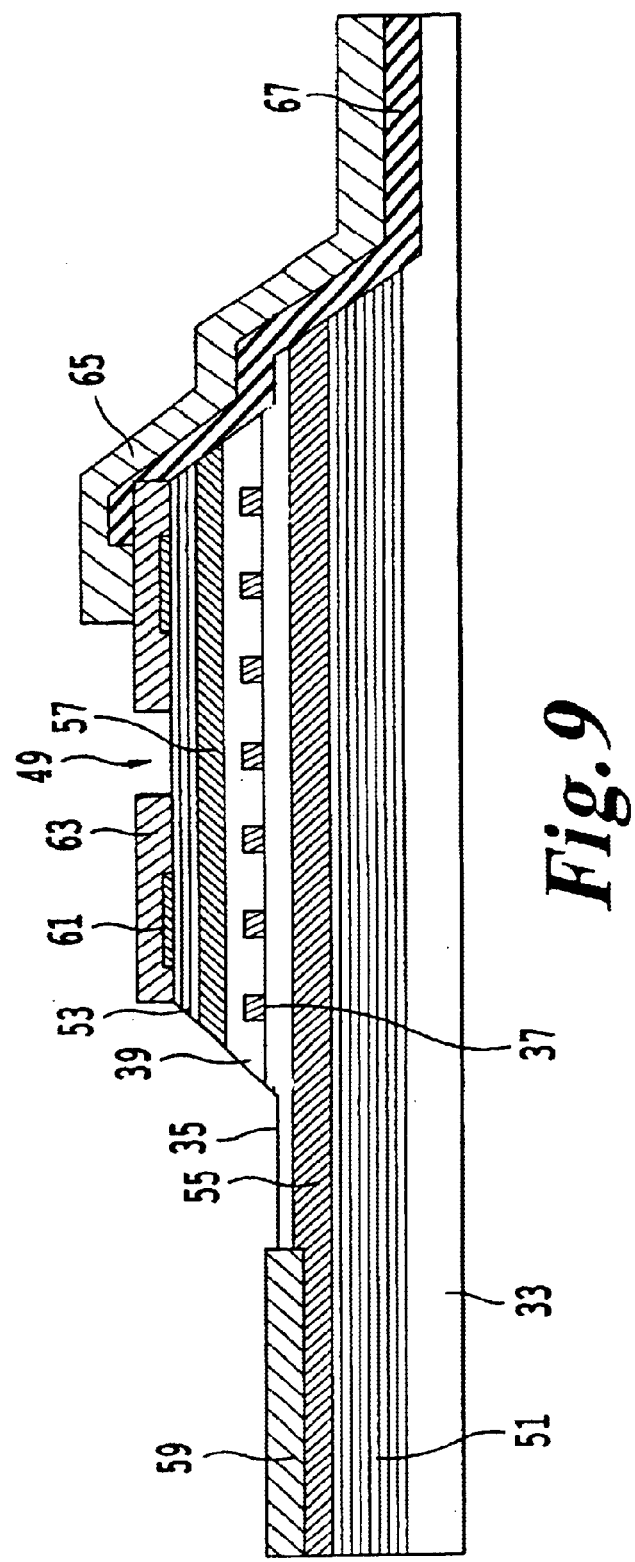
FIG. 9 is a device in accordance with a further embodiment of the present invention where an electric field is applied perpendicular to the plane of the layer of quantum dots.

FIG. 9 illustrates a device in accordance with a further embodiment of the present invention. This device relies on an p-type layer 55 and n-type layer 57 to apply an electric field perpendicular to the plane of the sample. This is an example of a bipolar device, in contrast to the unipolar devices described thus far.

In the same manner as the device of FIG. 6, a GaAs buffer layer 33 is formed overlying and in contact with a semi-insulating GaAs substrate (not shown). A lower p-doped Bragg mirror 51 is then provided overlying and in contact with said buffer layer 33. Said lower Bragg mirror comprises 10 pairs of alternating layers of AlAs (110.04 nm) and GaAs (95.46 nm), the GaAs and AlAs layers are p-doped with Beryllium having a concentration of $5 \times 10^{18}$ cm$^{-3}$. Optionally the lower Bragg mirror may also be undoped.

A p-type layer 55 is then formed overlying and in contact with said lower Bragg mirror 51. The p type layer 55 comprises 40.9 nm of GaAs doped with Be having a concentration of $5 \times 10^{18}$ cm$^{-3}$. A first intrinsic GaAs undoped layer 35 is then formed overlying and in contact with said p layer 59. The width of this layer is 148 nm.

A $In_xGa_{1-x}As$ undoped first barrier layer (not shown) having a thickness of 2 nm is then formed overlying and in contact with the first intrinsic layer 25. In this layer, x=0.3. InAs dot layer 37 is then formed overlying and in contact with first barrier layer (not shown). Approximately 1.8 monolayers of InAs are used to form the dot layer. A second barrier layer (not shown) comprising $In_xGa_{1-x}As$ layer is then formed overlying and in contact with said dot layer 37. This layer is the thickness of 2 nm and x is 0.3.

A second intrinsic GaAs undoped layer 39 is then formed overlying and in contact with said second barrier layer (not shown). The width of this layer is 148 nm.

N type layer 57 is then formed overlying and in contact with said second intrinsic undoped layer 39. The n-type layer comprises 40.9 nm of GaAs doped with Si at a density of $2 \times 10^{18}$ cm$^{-3}$. The device is then completed with an upper Bragg mirror 53 which sits on the n-type layer 57. Upper Bragg mirror 53 comprises five pairs of alternating layers of AlAs (111.04 nm) and GaAs (95.46 nm). Both these layers are n-type doped with silicon at a concentration of $4 \times 10^{18}$ cm$^{-3}$.

On fabricating the structure, first, a p-type contact 59 is made to p-type layer 55. The p-type contact is made by defining a pattern of contacts using standard photolithography techniques in such a way that photoresist was removed from the contact region. The contact region was etched, thus removing top DBR 53, the n-type layer 57, the first and second undoped layers 35 and 39 and the dot layer 37 from the contact region. The etch progressed into the p-type layer 55. AuBe alloy was then thermally evaporated onto the surface of the p-type layer 55 and a liftoff technique was used to remove the AuBe with underlying photoresist from the remainder of the surface to leave a clearly defined p-type contact 59.

The contact was then rapidly annealed at 480° C. for 180 seconds to alloy the metal and the p-type GaAs. The annealing was performed in a reducing atmosphere of $N_2+H_2$.

Any other suitable metal which forms Ohmic contacts to p-type GaAs could also be used, for example AuZn.

Next, n-type contacts 61 were defined in the same manner as the p-type contacts, the pattern of contacts was defined using photoresist. The resist was patterned and developed such that resist was removed from the contact regions. PdGe alloy was then evaporated onto the top of the sample and removed from the surface except from the contact regions using a lift-off technique. PdGe forms shallow contacts. On annealing these contacts at 380° C. for 300 seconds in a reducing atmosphere of $N_2+H_2$, these contacts form a good Ohmic connection to n-type layer 57 but do not short to the underlying p-type layer 55. As these contacts are annealed at a much lower temperature than the p-type contacts, the p-type contacts are not affected by the annealing of the n-type contacts.

A mesa structure was then formed to limit the dot layer, with diameters similar to previously described. The technique for defining the mesa employed in FIG. 6 was also used here. The etch depth was chosen so that it stopped in undoped first GaAs layer 35.

90 nm of Al 63 is then evaporated onto the top of mesa 41. This is achieved using standard photolithographic and evaporation techniques.

Although Al is the preferred material for the mask, any material of any thickness can be used providing that it fulfills the following criteria: firstly the mask needs to be essentially opaque to radiation emitted by the dot; secondly the mask needs to be chemically resistant to the solution used to etch the mesa; thirdly the mask should also be easy to selectively etch so that when it is subsequently etched in the following steps, the surface of the GaAs is not damaged.

Regardless of how the mesa and mask 63 are formed, eventually, the resulting structures are largely identical in that they comprise the same layer configuration, same contact configuration, and a mesa, the top of which is covered by a 90 nm Al layer.

The Al layer is opaque to the light emitted by the dots. In order to allow emission from the device from either a single dot or a limited number of dots, a small emission aperture 49 must be formed in the mask 63.

Electron beam lithography is used to form windows with an area between 0.01 and 4 $\mu m^2$ in the mask. This is achieved by spinning on an electron beam lithography resist such as PMMA, defining the window using an electron beam, developing the resist and then etching using Shipley developer for AZ 1800 series photoresist. However, any wet or dry etcher that attacks Al but not GaAs or the etch mask can be used. For example, $NaOH:H_2O_2:H_2O$. When the mesa is defined by using mask layer 63 as a etching mask, it may also be necessary to etch along the edge of the mesa to prevent the Al mask from short circuiting to the p-doped layer 55 as the Al mask 63 may have been slightly undercut by the mesa etch.

As an alternative to electron beam lithography, photo lithography may be used. For example, when the aluminium mask 63 is formed after the mesa etch, the mask may be formed with a small aperture 49 or apertures.

An isolated mesa is defined around the mesa described above so as to limit the area of the p-type layer. This mesa may be formed using the first technique discussed above where photoresist covers the top of the mesa and the semiconductor outside the photoresist etched through the p-type layer into the undoped layers below.

The above fabrication techniques allow light to be collected from a single quantum dot or a small number of quantum dots while still allowing a reasonably large contact area for contact to the top of the mesa.

External electrical connections may then be made in a similar way to described with reference to FIG. 6, by providing contact leads 65 overlying insulating layer 67.

The above fabrication is a preferred example. Other techniques may be used or variations on the above are possible. The order of the processing steps may be varied dependent on the annealing temperatures of the n-type and p-type contacts and the thermal stability of the material of the light emission mask 63. It is always important to process this structure so that annealing one contact does not affect a previously annealed contact. This is usually achieved by processing the layers which require higher temperature annealing first.

In addition to the above, it is important to ensure that none of the processing steps prior to the formation of aperture 63 cause the material of the emission mask to react with GaAs to form an opaque compound which is difficult to remove.

The p-type contact was formed by exposing the p-type layer 55 through etching. However, it is also possible to make this contact from the substrate side of the device if the buffer layer 33 and substrate (not shown) conduct.

By biasing the p-type layer 23 with respect to the n-type layer 31, an electric field is applied in the direction perpendicular to the sample. By careful choice of the voltage applied, $V_{deg}$, the Stark shift of the two bright exciton modes described with reference to FIG. 5, may be sufficient to provide a degenerate bright exciton level, leading to the emission of entangled photon pairs.

The recombining electrons and holes may be excited into the quantum dots either optically or electrically.

For optical injection, a pulsed laser, such as a laser diode, incident upon the structure, excited the biexciton state of the dot. The device is biased with the voltage required to produce near degeneracy of the bright exciton levels, $V_{deg}$, resulting in the mission of two entangled photons.

For electrical injection, an incident laser is not required. In this case, the bias applied to the device takes the form of repetitive pulses. During the pulse, the p-type layer is positively biased with voltage $V_{excite}$ with respect to the n-type layer, so as to induce a diode current. Electrons diffuse from the n-type layer 53 towards the p-type layer 55 and holes from the p-type layer 55 towards the n-type layer 53. Some of these electrons and holes will be trapped to populate quantum dot 37. By appropriate choice of $V_{excite}$, the dot may be excited with the biexciton state. The duration of the pulse is chosen to be less than the recombination time of the biexciton state. For example the pulse width may be 0.1 ns. Between the pulses, the device is biased with the voltage required to produce degeneracy of the bright exciton levels, $V_{deg}$. Radiative recombination occurs in the times between the excitation pulses, resulting in the emission of entangled photons. The repetition period for the pulses should be longer than the recombination time for the dot, for example it may be 10 ns.

As a variation of this device, the order of the p and n-type layers can be reversed. In this case, the layer structure following the bottom Bragg reflector 51 will consist of n-type layer 57, undoped layer 39, dot layer 37, undoped layer 35, p-type layer 55, and top DBR 53, with layer specifications as described with reference to this figure. The processing of this device is similar to previously described, making sure that the n-type material is contacted by the n-type shallow Ohmics described, and similarly for the p-type contacts. By reversing the polarity of the diode, the electric field can be applied in the opposite direction. The direction and magnitude of the built in electric field across the quantum dot is caused by the vertical spatial separation of the electron and hole wavefunctions within the dot, thus, the range of the effective electric field accessible in p-i-n, or n-i-p type samples may be different.

A device in accordance with a further embodiment of the present invention is shown in FIGS. 10a and b. FIG. 10a is a plan view of the upper surface of the device and FIG. 10b is the corresponding cross section of the device.

The device of FIGS. 10a and 10b primarily uses electrical injections of quantum dots to emit photons and an electric field to force the levels of the quantum dots to be degenerate.

The semiconductor layer structure is similar to that of FIG. 9 up to and including the formation of second Bragg mirror 53.

The three-tiered structure was then prepared by three wet etching processes similar to those described above.

The first etch penetrated through the first Bragg mirror 51 into buffer layer 33. This etch defines the total mesa area of the device.

The second etch defined a second smaller area, and penetrated into p-type layer 55 to expose region 64 of this layer, enabling a contact to be made.

The third etch defined a still smaller third area, and penetrated through n-type layer 57 into the intrinsic layer below, exposing third area 66, to enable shallow ohmic contacts to be made to second intrinsic layer 39.

Preferably the mesa defining the upper Bragg mirror 53 is made sufficiently small so as to support a single optical mode. This may be achieved with a mesa diameter of 1 $\mu$m. In this case the thickness of the first intrinsic GaAs region and second intrinsic region are adjusted so that the frequency of the optical mode coincides with the emission wavelengths.

The contacts were made to the device in the following way. First, the p-type Ohmic 59 was made (not shown on end elevation), as it requires the highest anneal temperature. The method employed was the same as described with reference to FIG. 9.

The shallow n-type ohmic 62 was then made in the same way as described with reference to FIG. 9, though this time the gate was placed over the central area of the top of Bragg mirror 53. This prevents light from escaping from the top of the device, but since the substrate material is transparent to light of the desired wavelength, emission can be collected easily from the bottom of the device. The collection efficiency may be enhanced by etching a window in the substrate material, as far as the lower Bragg mirror in the emissive region. This window may be anti-reflection coated with a suitable dielectric material. If the emission is collected from the substrate side, the Bragg mirror on the substrate side should have fewer repeats than the upper Bragg mirror. For instance lower Bragg mirror may have five repeats and upper Bragg mirror may have 10.

Alternatively an aperture or apertures may be made in the upper metal layer to allow light to escape from the active quantum dot.

Shallow n-type ohmic contacts 31 were then fabricated as described with reference to FIG. 6, but with extra care taken so that the contact does not penetrate completely through the first intrinsic layer 35, to prevent short circuiting to p-type layer 55. Optionally this contact may be made simultaneously with contact 62.

An insulating layer 45 was then fabricated in a similar way to described with reference to FIG. 6, covering the total area of the device, except the regions to which electrical contacts were to be made.

Conducting wires were then fabricated, running from each of the 4 contact areas over the insulating material, to large metallic contact pads away from the mesa, by the same method as described with reference to FIG. 6.

The arrangement of the contact pads is illustrated in FIG. 10a. The contact pads 43 to side contacts 43 are situated opposite one another and connect to the top of the second exposed area 66. The contact 64 to the n-type contact 62 and is situated between contact pads 43. The p-type control 59 is provided partially overlying the second exposed area 64.

The preferred mode of operation of the device is as follows. By applying a positive voltage to p-type Ohmic contact 59 with respect to n-type Ohmic 62, a current will flow through the region containing the quantum dot. Some electrons and holes will be captured in the dot, populating the dot with the biexciton state. The potential of Ohmic contact 59 is then reduced with respect to 62, to allow the biexciton state to decay into the ground state without re-excitation. At this point in time, a potential difference will exist between the quantum dot and the n-type contact 62.

To avoid current flow from the region of the quantum dot towards penetrating contacts 30 and 31, the potential difference between the region close to the quantum dot and regions 30 and 31 should be close to zero. This can be achieved by applying an appropriate bias to both side leads 42 and 43.

By lowering the potential on one side lead 42 by the same amount as an increase in potential on the other side lead 43, it is possible to maintain the same average potential difference between penetrating contacts 31 and n-type contact 62, at the same time as applying a static in-plane electric field. By the turning of this field, it is possible, as described with reference to FIG. 5, to tune the energies of the bright exciton levels so that they are degenerate.

This device is designed so as to separate the current injection and static electric field means, so that greater control over both the light emission intensity and the energies of the bright exciton levels can be independently provided by two pairs of contacts, thus facilitates the electrical generation of polarisation entangled photon pairs, with independent control of the intensity and bright exciton level splitting. A single quantum dot is isolated in this case partly by reducing the quantum dot layer area 37 by etching a mesa, and from there a single quantum dot is selected by the even smaller area of the top mirror. The small size of the top mirror limits the spatial extent of the optical cavity mode in the plane, and thus provides optimal coupling with only the quantum dot beneath it.

The penetrating contacts 30 and 31 could alternatively be p-type.

The device shown in FIGS. 11a and 11b is similar to that described with reference to FIG. 10, except that the side contacts 31 are shallow contacts and are made to n-type regions 69a and 69b provided above second undoped layer 39.

The device is grown the same as described with reference to FIG. 10. The processing deviates from the description of the processing with reference to FIG. 10 in a few ways. The mesa is now etched using a four-step process using methods similar to previously described.

As before, the first etch extends down to GaAs buffer layer 33 to define the mesa area. The second etch extends through the first intrinsic cavity region 35 to the p-type layer 55, reducing the area of quantum dot layer 37 and defining second smaller area 64.

The third etch patterns the upper Bragg mirror 53 by etching down to doped layer 57, so as to leave the material in the region of the side and top contacts.

The final etch process then etches through n-type layer 57, to isolate two areas 69a and 69b, the section of the n-type layer 57 which lies under second Bragg mirror 53.

P-type connections 59 to p-type layer 55 are then fabricated as described with reference to FIG. 10. Shallow n-type contacts 62 and 68a and 68b are then made by the method described with reference to FIG. 10. Shallow n-type contact 62 is made to second Bragg mirror 53. Shallow n-type contacts 68a and 68b are made to isolated n-type regions 69a and 69b. The device is then completed by adding insulating layer 45 and metal contacts 43, 65, and 69 as described previously. Metal contacts 43 are made to shallow n-type contacts 68a and 68b. FIG. 11a shows a plan of the contact pad arrangement which is the same as that described with reference to FIG. 10a. The device of FIG. 11 operates in the same manner as the device of FIG. 10 that n-type regions 69a and 69b are used to force the bright exciton levels to become degenerate.

Figure 12A:
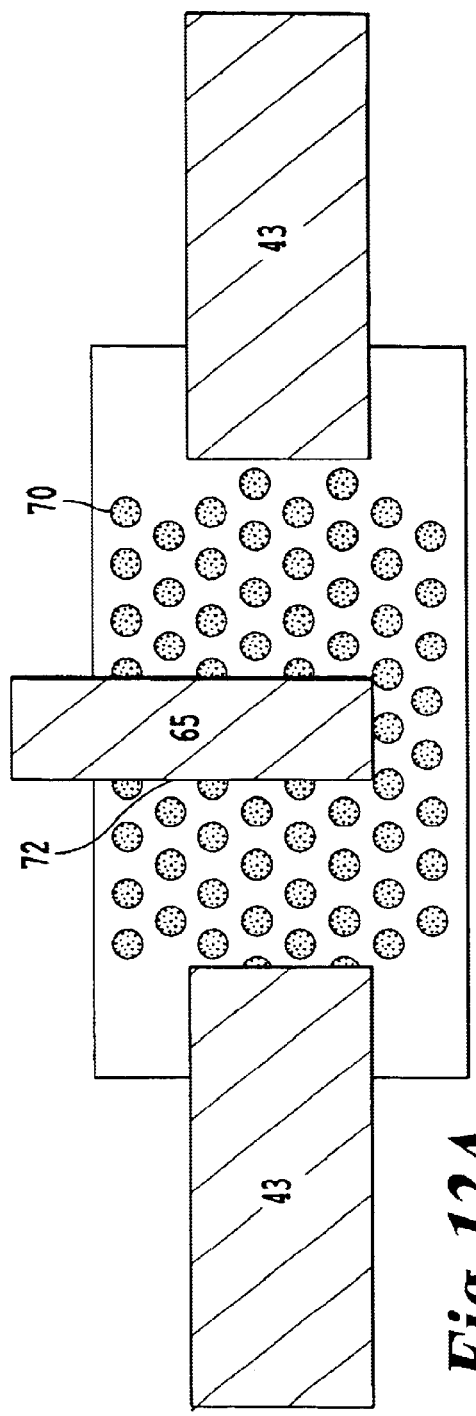
FIG. 12a is a plan view of a variation on the device of FIGS. 11a and 11b.
Figure 12B:
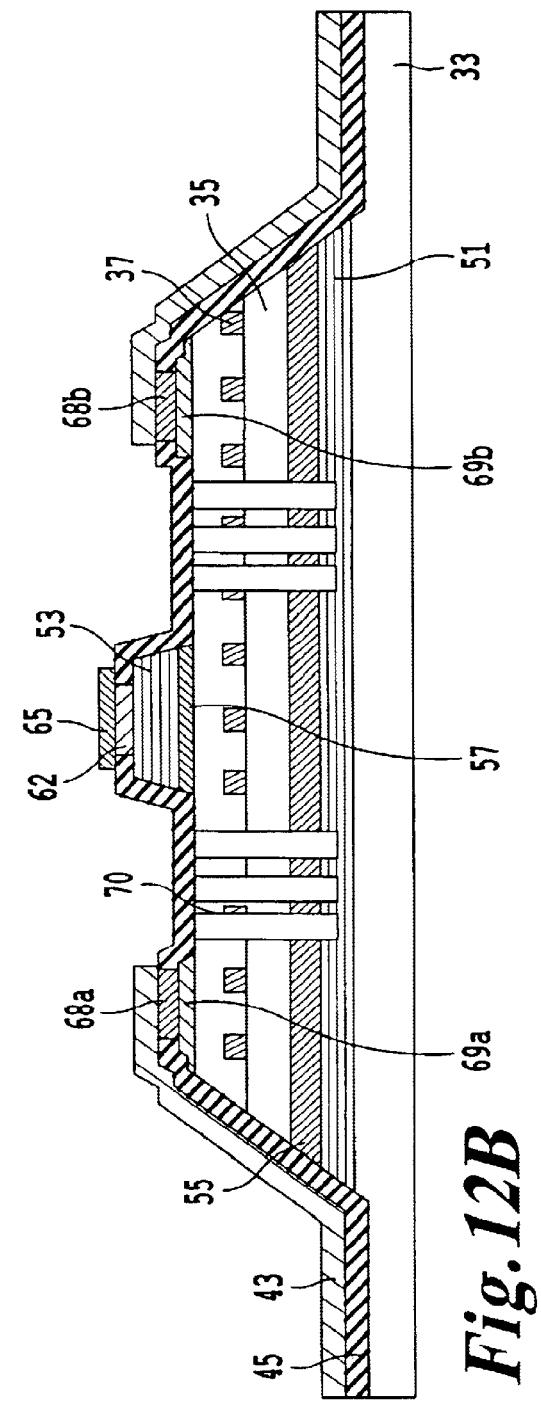

As previously described, the reduced size of upper Bragg mirror 53 in FIG. 11b provides a single mode cavity where the spatial extent of the optical cavity is essentially confined in three dimensions. The device of FIGS. 12a and 12b illustrate a further technique of producing a single mode optical cavity using a photonic band gap structure.

The device of FIG. 12 is fabricated in the same manner as described for the device of FIGS. 11a and 11b up to and including the formation of upper Bragg mirror 53.

In contrast to the device of FIG. 11, the device is formed in a p-type substrate and GaAs buffer layer 33 is a p-type buffer layer 33. Further, lower Bragg mirror 51 is also a p-doped Bragg mirror 51.

As for FIG. 11, a first etch extends down to GaAs buffer layer to define the mesa area.

The device of FIG. 11 uses a second etch which allows contact to be made to p-type layer. The device of FIG. 12 does not require such an etch because the device is grown on a p-type substrate. Therefore, contact may be made to the p-type layer from underneath the device.

Next, an etch is performed to define the upper Bragg mirror 53.

A penultimate etch is performed in order to pattern n-type doped layer 57 in order to isolate areas 69a and 69b.

Finally, a plurality of holes are defined using electron beam lithography techniques. These plurality of holes are then etched into a structure that defines plurality of trenches 70. These trenches extend through quantum dot layer 37 and into lower Bragg mirror 51.

FIG. 12a illustrates a plan view of the pattern of trenches. It can be seen that the trenches form a regular pattern with an irregularity 72 in the middle. The irregularity is centered underneath upper Bragg mirror 53. The pattern of trenches results in a periodic variation in the refractive index in two dimensions within the plane of the quantum dot layer 37. This forms a so-called photonic band gap structure and serves to confine the photonic wave function in two dimensions within the plane of the quantum dot layer 37. Thus, three dimensional optical confinement is achieved since the upper 53 and lower 51 Bragg mirrors serve to confine the photons in the third direction perpendicular to the plane.

The remainder of the device is fabricated in the same way as described with reference to FIG. 11.

The material of the insulating layer 45 may flow into the trenches 70. This does not matter since the insulating layer will also provide a difference in refractive index within the two dimensional plane of the quantum dot layer 37 and will not adversely affect the photonic band gap structure.

Obviously, p-type connection 59 is not required. Instead, a p-type contact is provided on the underneath side of the substrate (not shown).

Figure 13:
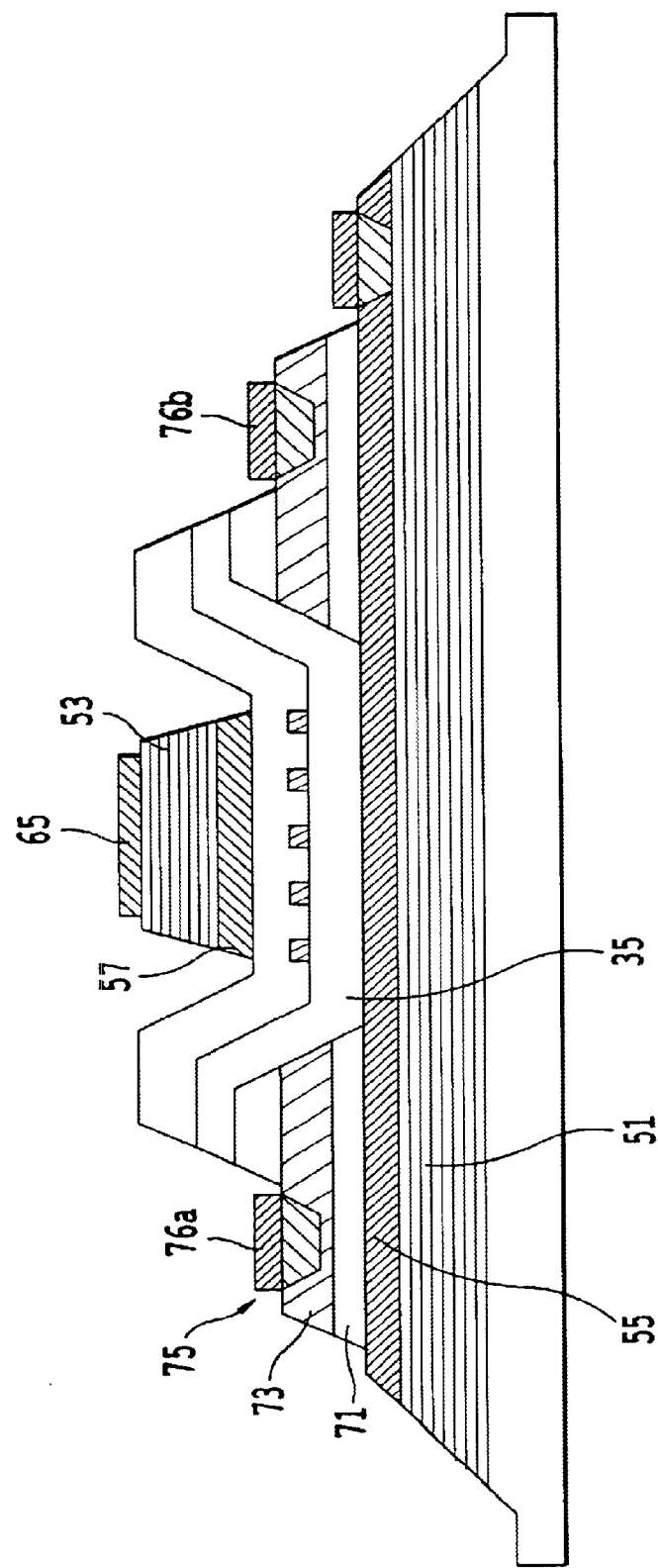
FIG. 13 is a device in accordance with a further embodiment of the present invention fabricated using a regrowth technique.

FIG. 13 illustrates a further device in accordance with an embodiment of the present invention, that is fabricated, in part, by a regrowth technique.

The layers described have similar thicknesses and compositions as previously described unless otherwise stated. Like reference numerals will be used to denote like features.

The first growth procedure proceeded as follows. Following GaAs buffer layer (not shown), a bottom Bragg mirror 51 was deposited. P-type back gate 55 was then grown overlying and in contact with Bragg mirror 51. A third undoped layer 71 was then deposited over Bragg mirror 51. Third undoped layer 71 comprises 100 nm of undoped GaAs.

An n-type electric field pole layer 73 is then deposited overlying and in contact with layer 71. N-type layer 73 comprising 200 nm of GaAs doped with Si at a concentration of $2 \times 10^{18}$ cm$^{-3}$. Capping layer 75, comprising 100 nm of undoped GaAs is then deposited overlying and in contact with n-type layer 73.

The preferred thicknesses of layers 71, 73, and 75 are as described above, however, some variation is possible, as the critical point is to have at least some part of n-type layer 73 level, or almost level with quantum dot layer 37.

A small area of the structure is then etched away, through third undoped layer 71, and stopping at p-type layer 55. An etch is used which produces sloping side walls.

The wafer is then returned to the MBE chamber and a further sequence of layers is deposited. The sequence of layers are the same as described with reference to FIG. 9 including first intrinsic cavity layer 35, first InGaAs barrier layer (not shown), quantum dot layer 37, second InGaAs barrier layer (not shown) and second cavity region 39.

The device growth is then completed by n-type layer 57, and top Bragg mirror 53.

A four tier etch is then performed. The first etch is a mesa etch, which isolates the device. The second etch proceeds down to the p-type layer 55 to allow contact to be made to this layer. The third etch proceeds down to the n-type layer 73 to allow the two n-type contacts 76a, 76b to be made to this layer. This n-type layer 73 and contacts will function as side contacts 31 in the completed device. Finally a fourth etch is performed define the extent of the second Bragg mirror 53.

Figure 14A:
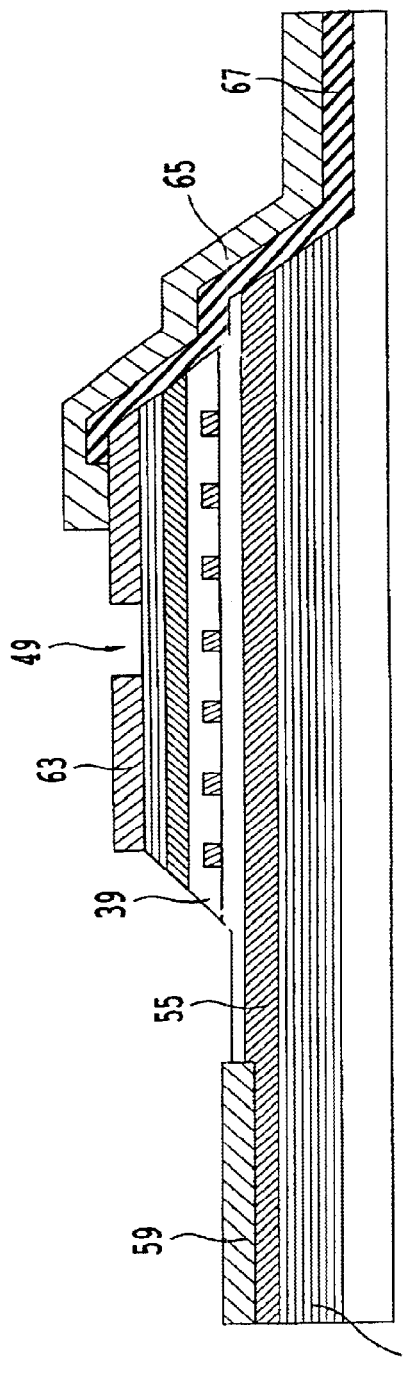
Figure 14B:
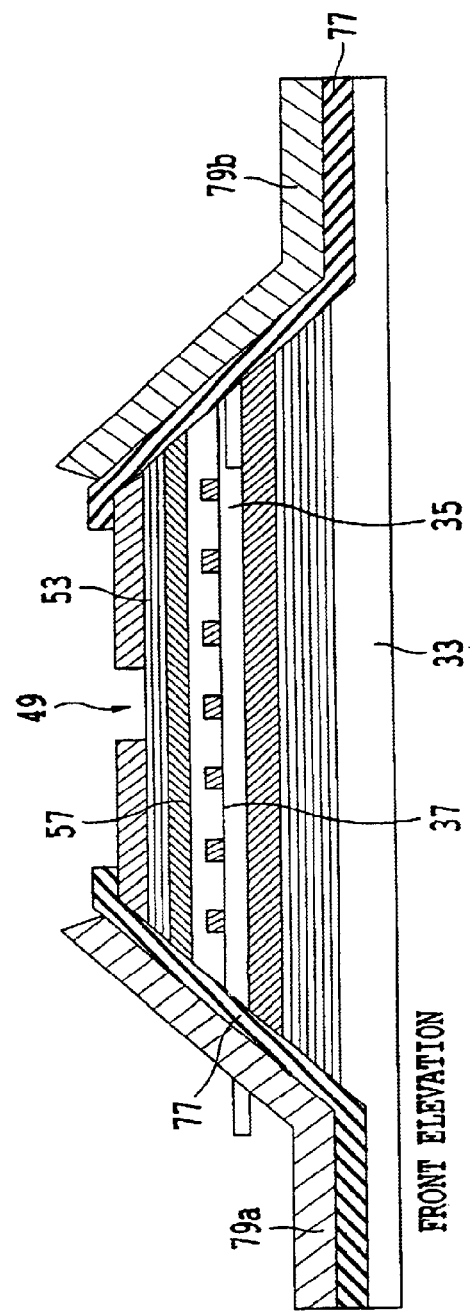

The device shown in FIGS. 14a and 14b is fabricated as described with reference to FIG. 9 up to the point just before insulating layer 67 is deposited. The side elevation shown in FIG. 14a and FIG. 9 are initially identical. However, the front elevation 13b shows new contacts 79a and 79b. These are insulated from the structure by insulating layer 77. Metal contacts 79a and 79b are formed in the same manner as contact layer 65 as described with reference to FIG. 9. Insulator 77 is formed with insulating layer 67 described with reference to FIG. 9.

In operation, the quantum dots 37 are electrically injected using n-type contact 63 and p-type contact 59. An electric field is applied across the quantum dots 37 using insulated metal contacts 79a and 79b.

In the device of FIGS. 14a and 14b, light from a single quantum dot is isolated by aperture 49, and extracted from the top of the device.

Figure 15:
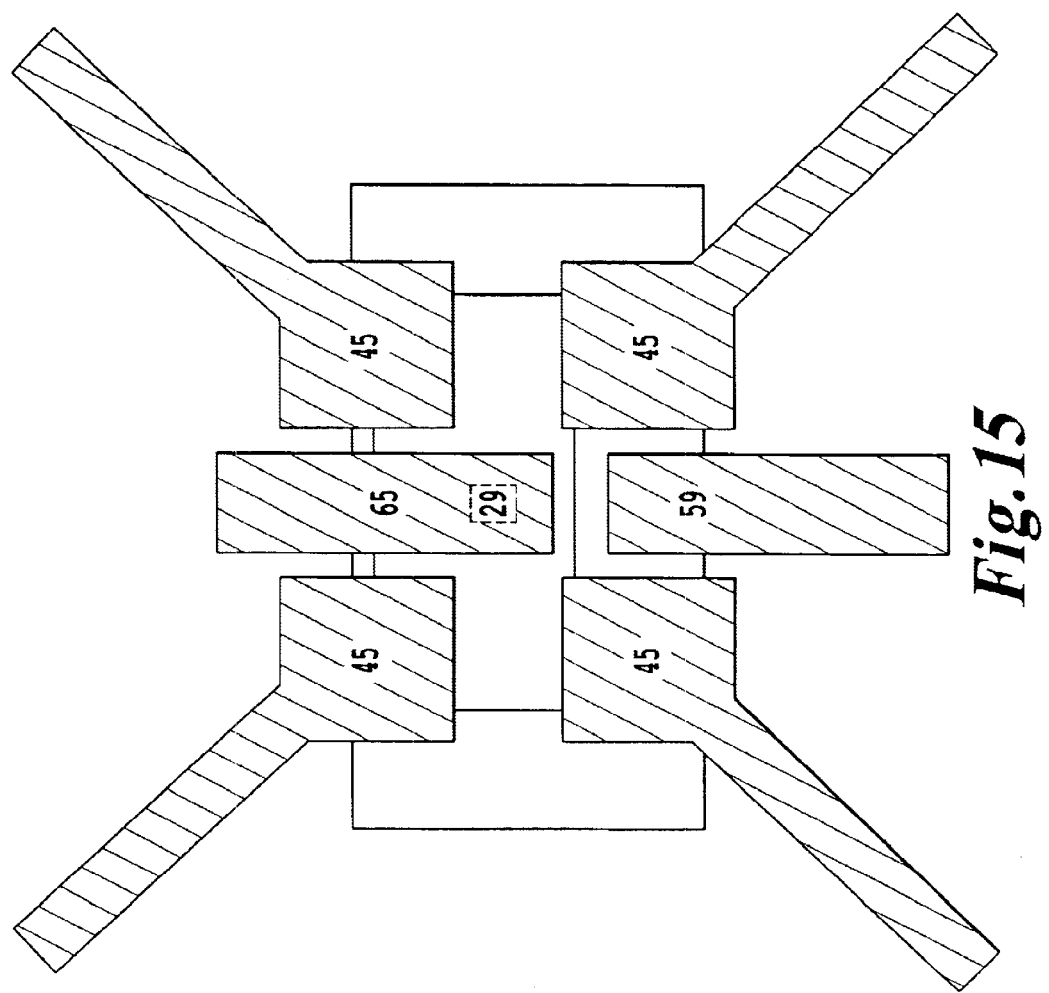
FIG. 15 is a plan view of a contact arrangement of a device in accordance with an embodiment of the present invention.

In each of the devices described with reference to FIGS. 10 to 14, two penetrating contacts 30 and 31 or the equivalent of two side contacts have been used to apply an electron field to force the bright exciton levels to become degenerate. In FIG. 15, four side contacts 45 or their equivalents are used to apply the field to cause the Stark effect.

The four side contacts form a cross geometry as shown in FIG. 15, with quantum dot 29 at the centre. By controlling the voltages of all 4 side contacts 43 relative to injectors 65 and 59, it is possible to apply an electric field in any direction in the plane of the wafer. As the dot is not symmetrical, the Stark shifts are expected to be dependent on the direction of the electric field. Using all four side contacts, a field can therefore be applied in the optimum direction.

Figure 16:
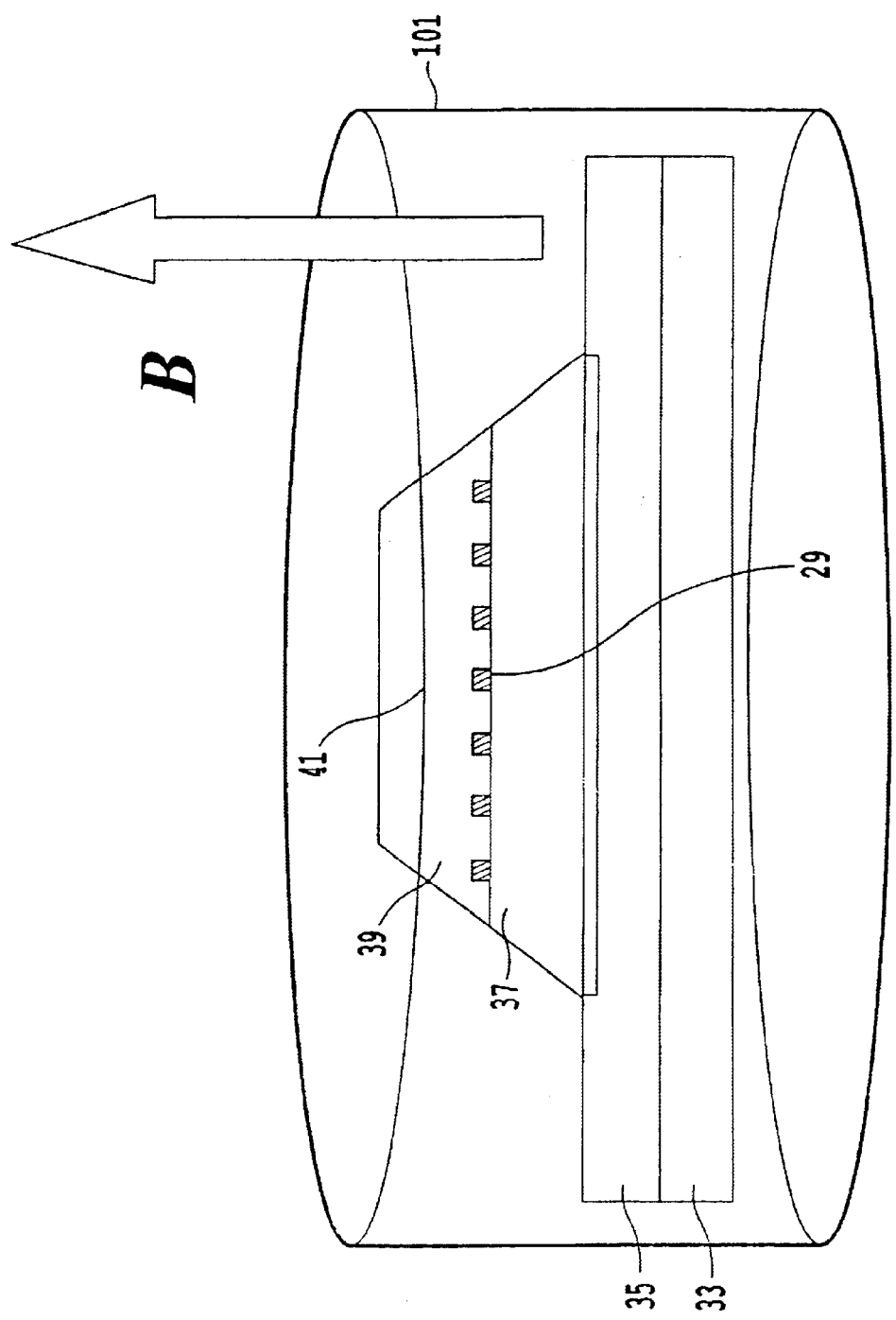
FIG. 16 is a device in accordance with an embodiment of the present invention, a perpendicular magnetic field being applied to force the bright exciton levels to be degenerate.

FIG. 16 illustrates a further device in accordance with the preferred embodiment of the present invention. The previous device of using applied electric field to force the naturally non-degenerate bright exciton levels to be degenerate.

In FIG. 16, a magnetic field which is applied perpendicular to the plane of the quantum dot layer is used.

The device is essentially the same as that described with reference to FIG. 6. However, the penetrating contacts 30 and 31 (which were used to apply an electric field) are not provided. Further, insulating layer 45 and contact layer 43 are also not present.

This simplified device is then placed inside solenoid 101. Solenoid 101 is shown schematically as a cylinder. It will be appreciated by those skilled in the at that the solenoid will be one with wires. These are not shown for clarity reasons. The central axis of the cylindrical solenoid 101 is parallel to the plane of the quantum dot layers. This arrangement is known as a Faraday configuration. Typically, a magnetic field in the region of 0.4 Tesla is required to induce a shift of approximately 50 $\mu$eV which is typical of the bright exciton level splitting energy.

Figure 17:
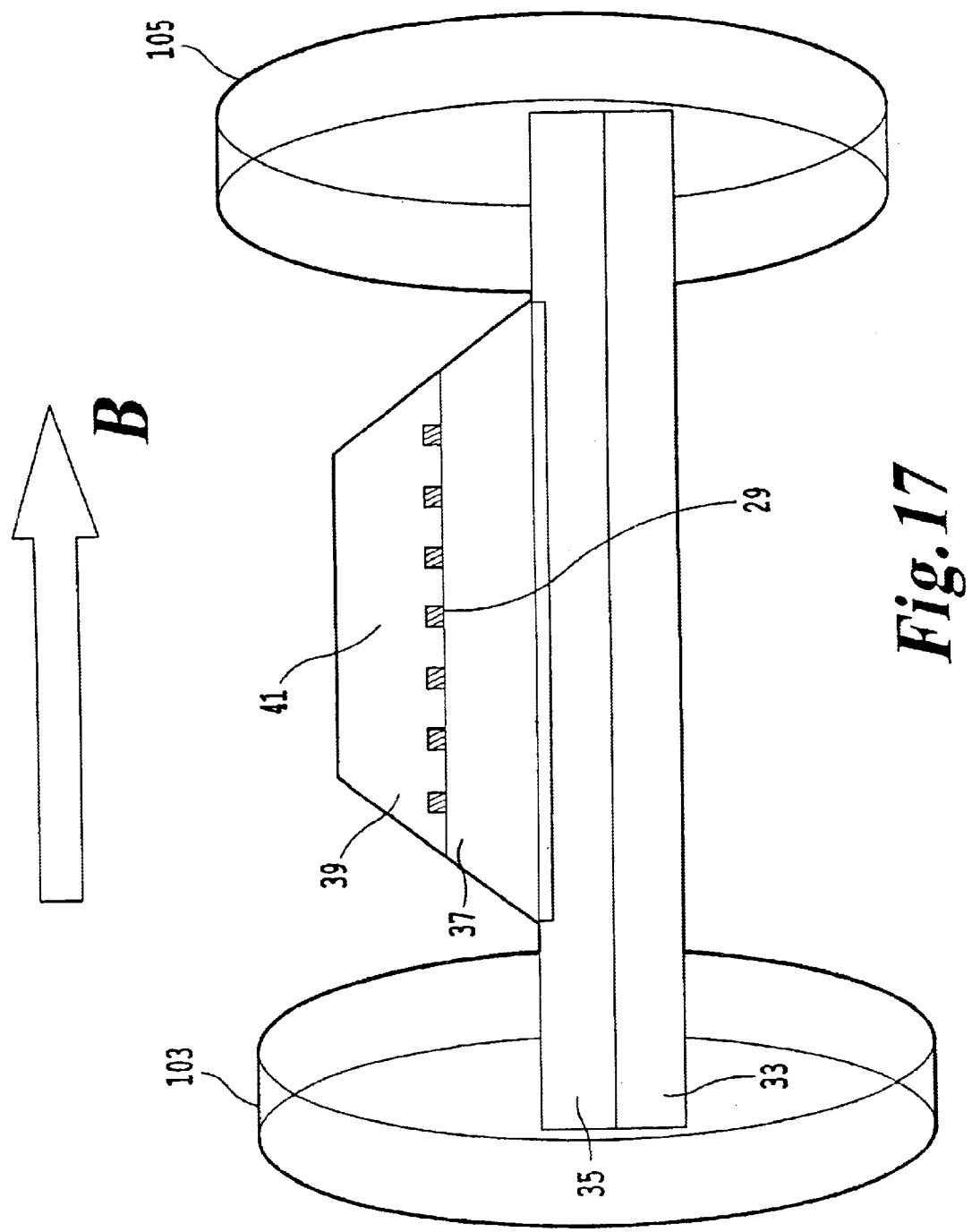
FIG. 17 is a device in accordance with an embodiment of the present invention, a parallel magnetic field being applied to force the bright exciton levels to be degenerate.

FIG. 17 illustrates a further device in accordance with a preferred embodiment of the present invention. The photon source itself is identical to that described with reference to FIG. 16. The photon source is provided inside a pair of solenoids 103 and 105. The solenoids have parallel axis and are separated by a small gap. The plane of the quantum dot layers is the oriented parallel to the solenoid axis. This causes a parallel magnetic field to be applied. In this configuration, a field of about 1 Tesla is required in order to reduce the shift of approximately 50 $\mu$eV.

Figure 18:
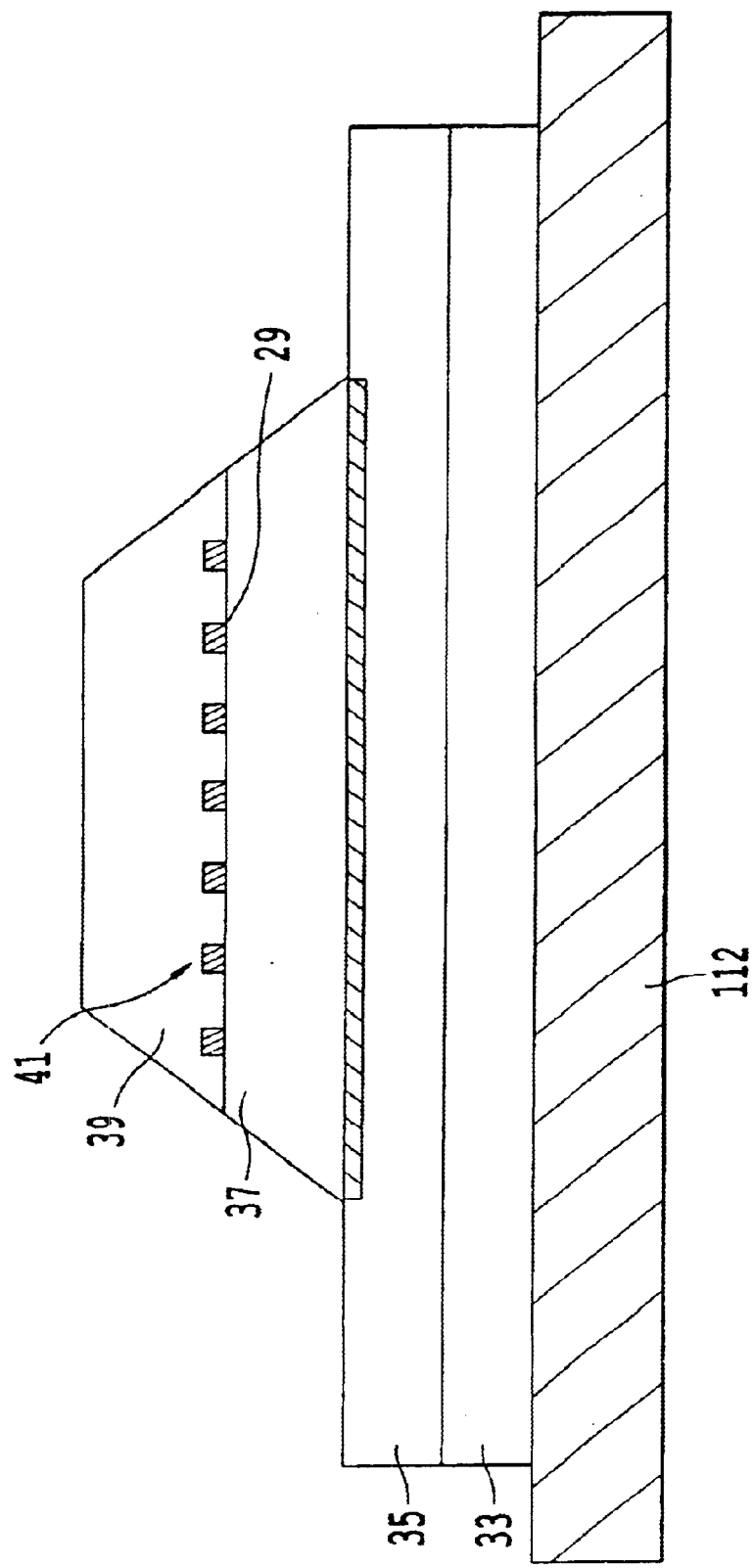
FIG. 18 is a device in accordance with an embodiment of the present invention, with means for varying the pressure to free the bright exciton levels to be degenerate.

FIG. 18 illustrates a device in accordance with a further embodiment of the present invention.

Here, the photon source is mounted on piezo-electric device 112, configured to expand and contract in the lateral direction, under the application of an electric field. The piezo-electric device 112 thus controls the strain across the device. In this particular example, the strain is applied uniaxially along a direction in the plane of the device, in this particular case, directly along the plane of the quantum dot. By suitable choice of the applied strain, the two bright exciton levels may be forced to be degenerate.

Figure 19:
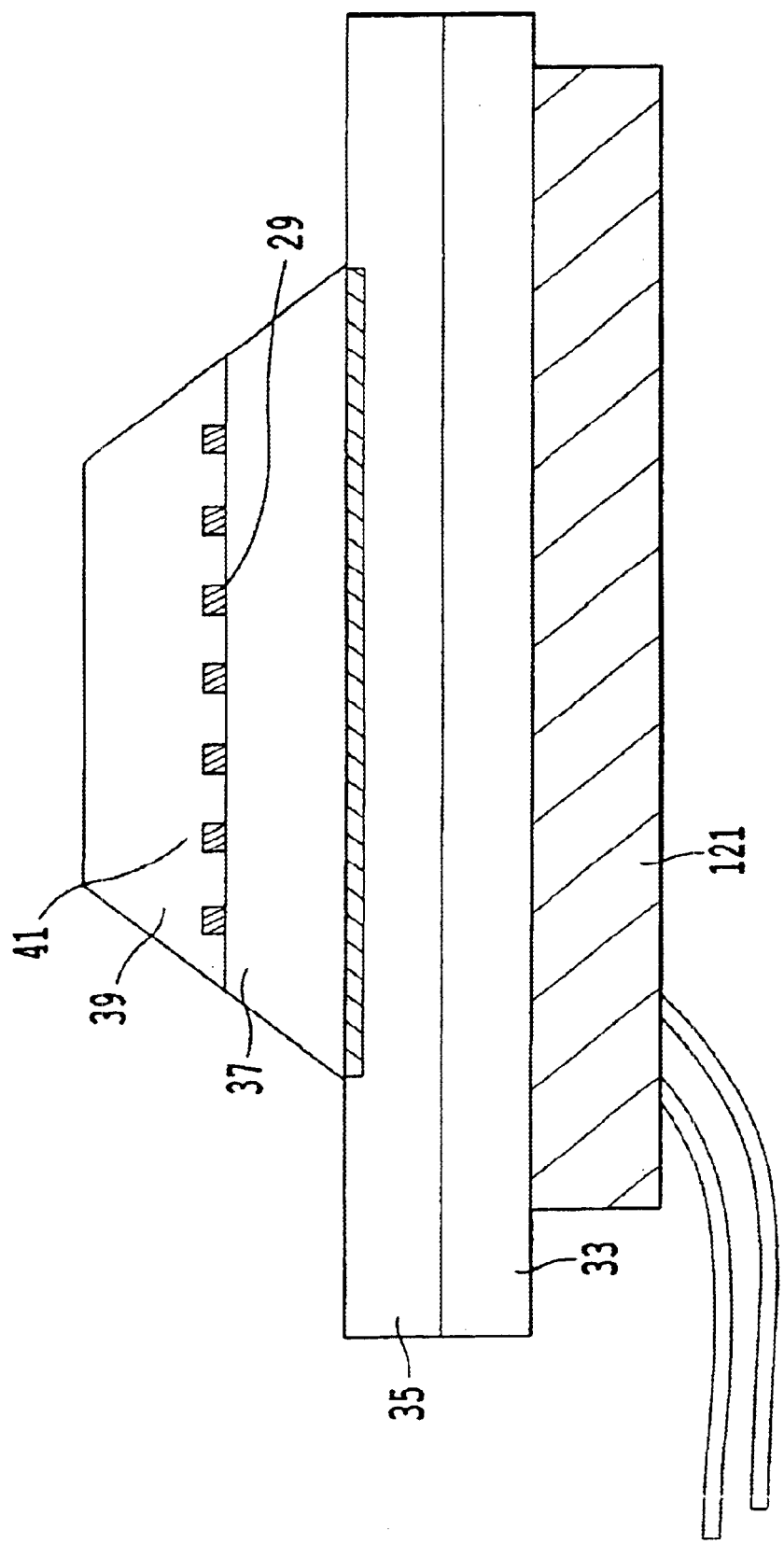
FIG. 19 is a device in accordance with an embodiment of the present invention, with a thermoelectric cooler for varying the temperature to force the bright exciton levels to be degenerate.

FIG. 19 illustrates a further device in accordance with a preferred embodiment of the present invention. The photon source is identical to that described with reference to FIG. 15. However, the basic photon source is provided on thermoelectric cooler 121. Cooler 121 controls the temperature of substrate 33, and hence the whole of the photon source. As the device temperature decreases, thermal contraction of the semiconductor crystal will affect distribution of the strain across the volume of the dot. The dot is already in a highly strained state due to the large lattice mismatch between InAs and GaAs. The alloy composition throughout the dot is also not well defined due to the nature of formation of the self-assembled quantum dots. Therefore, localised strain at certain points will be affected differently and this could result in a large strain induced energy shift to bright exciton levels. Thus, by varying the temperature, the bright exciton levels can be made degenerate.

Figure 20:
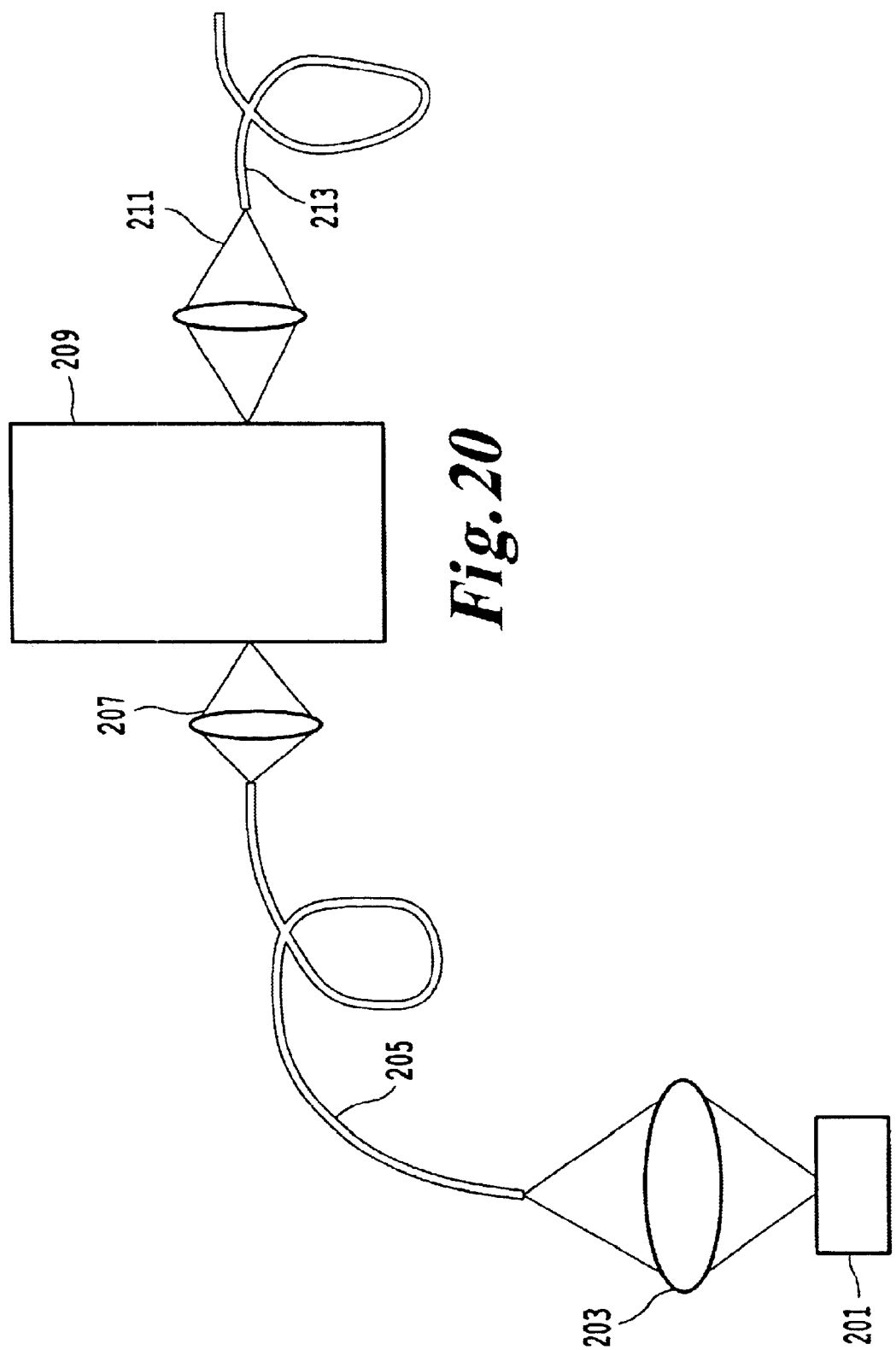
FIG. 20 illustrates an experimental arrangement for collecting light emitted from a source in accordance with any of the above embodiments.

FIG. 20 illustrates an experimental arrangement for collecting the output from the source body described in relation to any of the preceding figures. 201 represents a photon source body which may be any of those described with reference to FIGS. 6 to 19. Output from source body 201 is then collected by lens 203 and is focused into fibre optic coupling fibre 205.

The output from fibre output coupling 205 is then collected by lens 207 and directed into the spectrometer 209. Spectrometer 209 is tuned to pass radiation at a specific wavelength. If it is desired to collect the two photons which are emitted due to biexciton decay, then the spectrometer 209 is tuned to pass photons having both of these wavelengths for the emitting dot. If a plurality of dots are located in the active area of the device 201, then the spectrometer may be tuned to just allow the passage of photons arising a particular dot.

The output from spectrometer 209 is then collected by lens 211 and directed into output fibre 213 for use as required.

Even if only one dot is emitting in the device, spectrometer 209 is still desirable because there is likely to be spurious emissions from other parts of device 201.

In FIG. 20, the spectrometer 209 is provided remote from device 201. However, in practice, means may be provided on the actual device itself in order to filter out spurious emissions. For example, a diffraction grating or interference filter may be provided on the upper surface of the device, or the dot may be placed in a resonant cavity.

Figure 21:
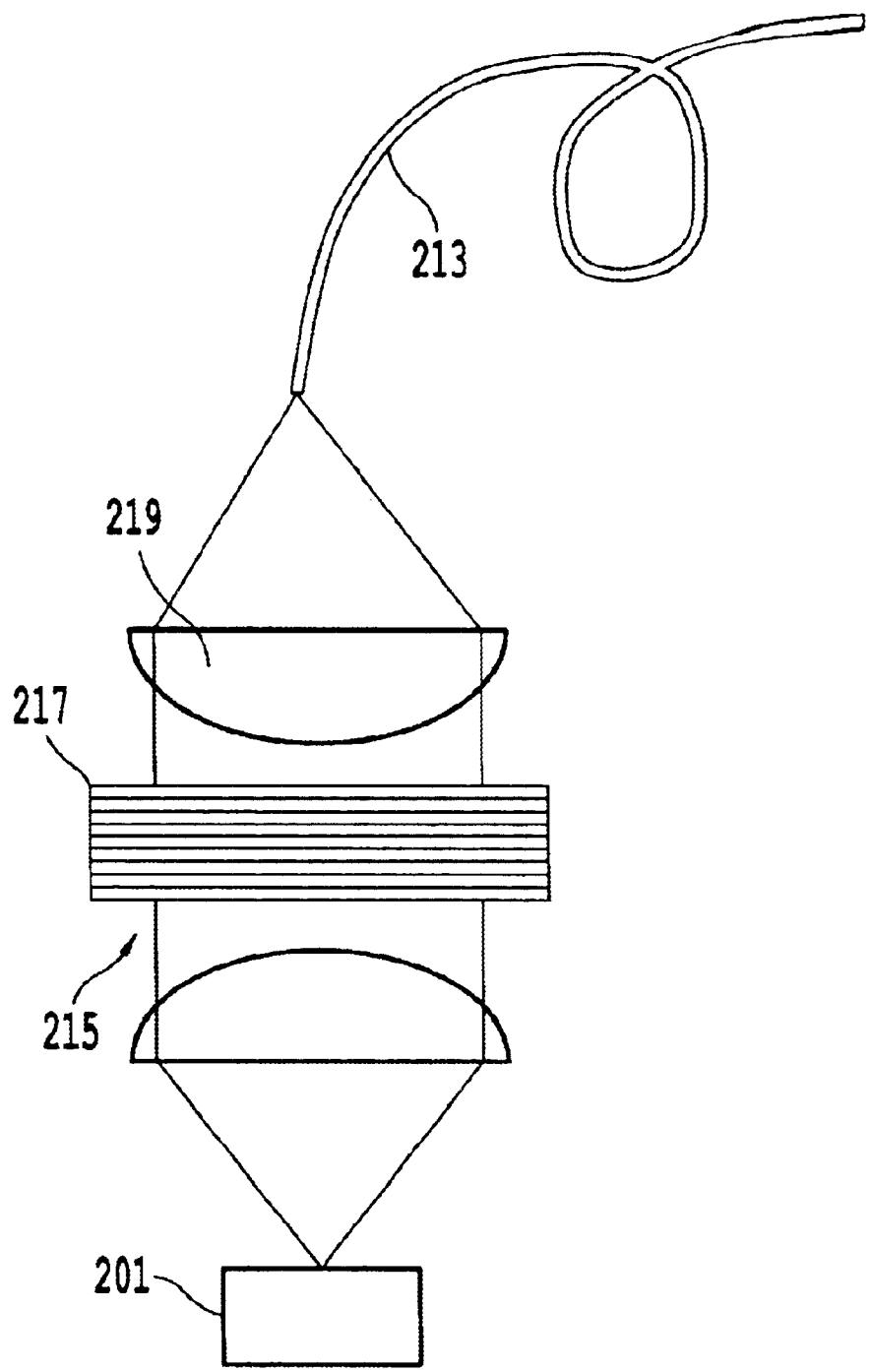
FIG. 21 shows a variation on the experimental arrangement of FIG. 20.

FIG. 21 shows a variation on the experimental arrangement of FIG. 20. To avoid unnecessary repetition, like reference numerals will be used to denote like features.

In FIG. 21, device 201 emits photons, these are collected by convex lens 215 and directed onto spectral filter 217 which operates in a similar manner to that of spectrometer 209. The output from spectral filter 217 is then collected by second convex lens 219 and directed into output fibre 213.

The apparatus described with reference to FIGS. 20 and 21 are tuned to collect the two photons which are emitted due to bi-exciton decay.

Figure 22:
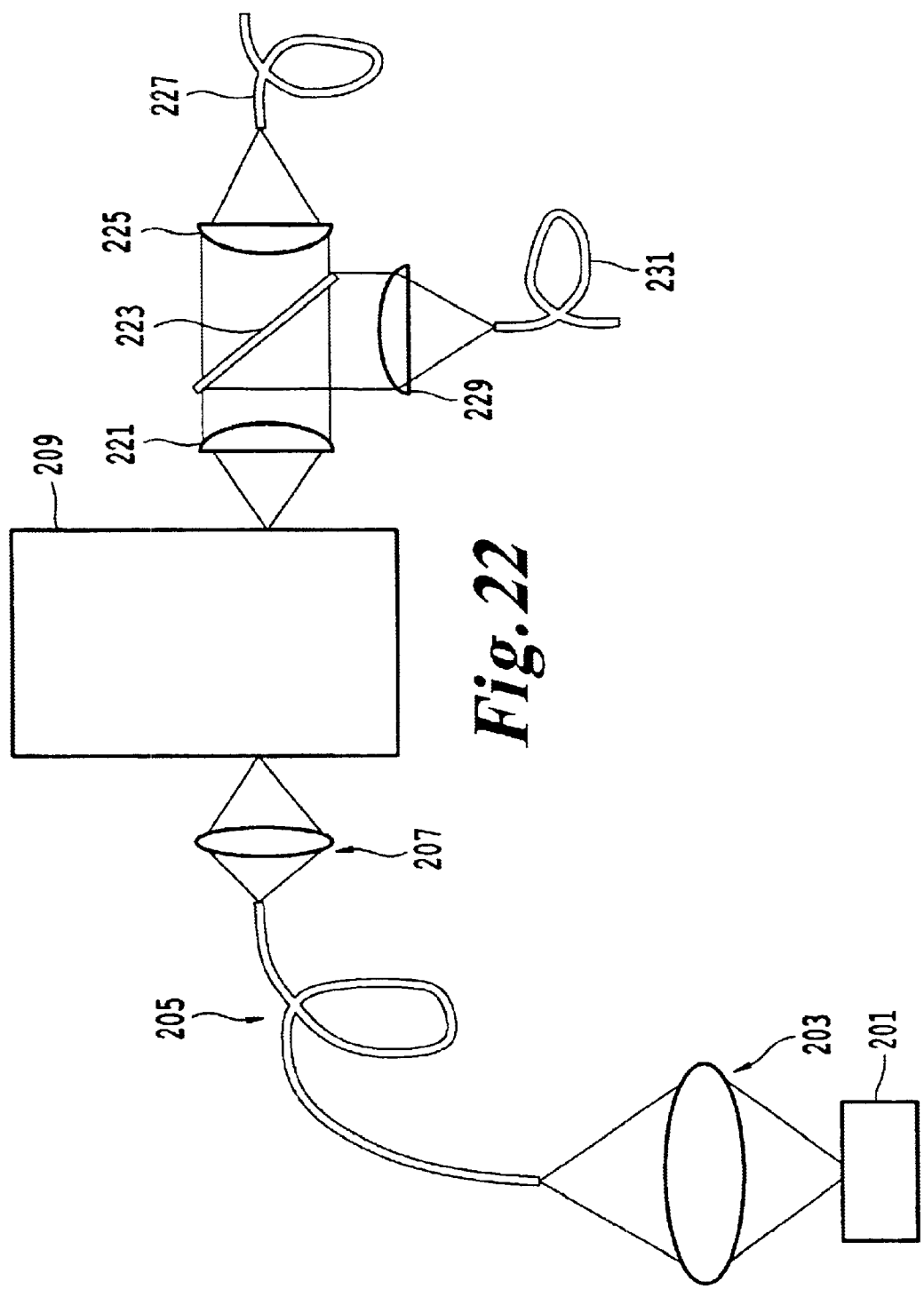
FIG. 22 illustrates an experimental arrangement for collecting and separating an entangled photon pair for sources in accordance with the above embodiments.

FIG. 22 illustrates a variation on the apparatus of FIG. 20 which is used to collect an entangled photon pair as explained with reference to FIGS. 20 and 21, and to further separate the two photons emitted due to biexciton decay.

To avoid unnecessary repetition, like reference numerals will be used to denote like features. Spectrometer 209 is configured to pass both photons arising from a bi-exciton transition and the corresponding single exciton transition from a desired dot. The output of spectrometer 209 is then collected by convex lens 221 and directed onto dichoric mirror 223. The dichoric mirror is configured to pass photons of a certain energy and reflect other photons. Therefore, photons passed by the dichoric mirror are collected by lens 225 and passed into first output fibre 227, photons reflected by dichoric mirror 223 are collected by lens 229 and are passed into second output fibre 231. Dichoric mirror 223 is configured so that it can distinguish between photons from a single exciton transition and a bi-exciton transition.

Figure 23:
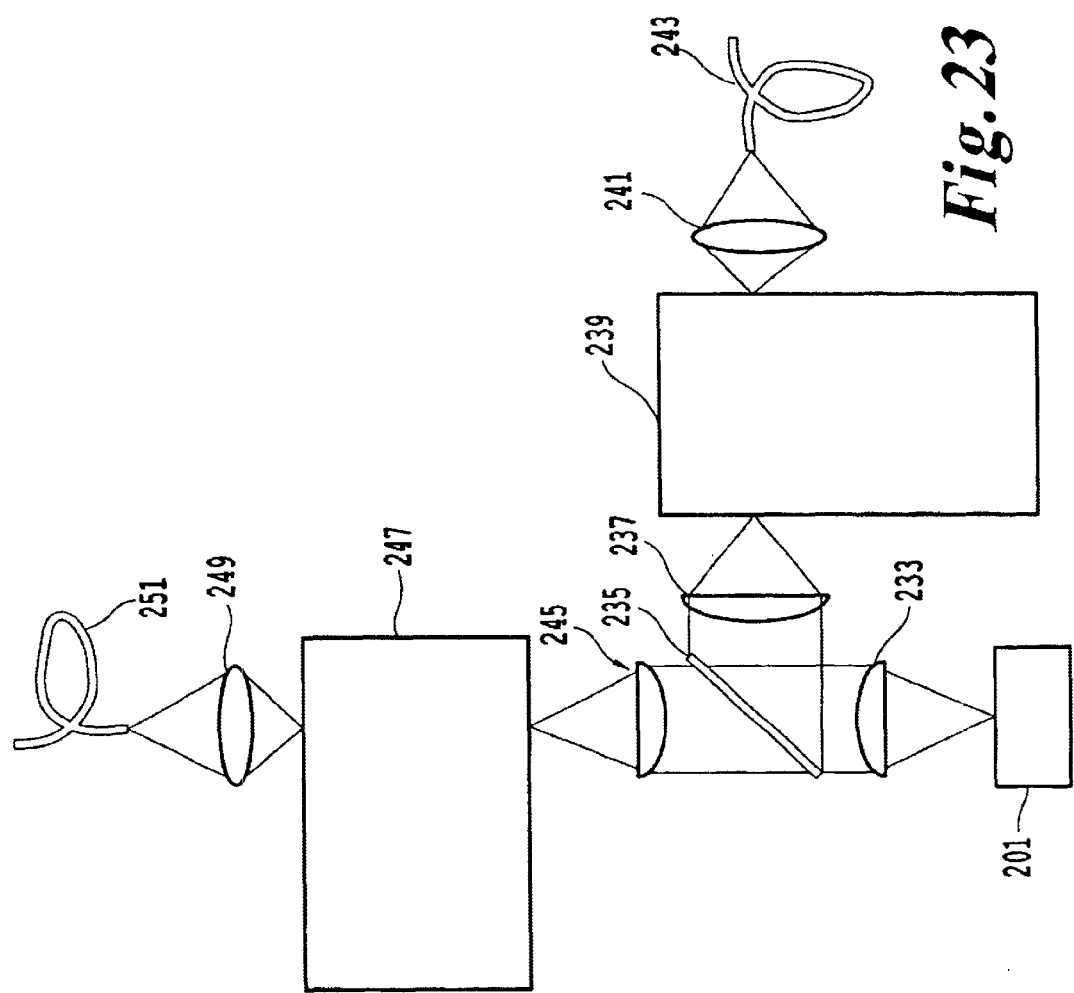
FIG. 23 shows a variation on the apparatus of FIG. 22 for obtaining and separating an entangled photon pair.

FIG. 23 shows a further variation on the apparatus of FIG. 22. Here, photons from the bi-exciton transition and the single exciton transition are separated before the signal is filtered. In this example, lens 233 collects photons emitted from device 201 and directs them onto dichoric mirror 235. Photons reflected from dichoric mirror 235 are collected by lens 237 and directed into spectrometer 239. Spectrometer 239 is configured to pass photons only with the energy corresponding to either bi-exciton or single exciton transition of the desired dot. For example, if the dichoric mirror 235 is configured to reflect photons having an energy of the single exciton transition, then spectrometer 239 is also configured to only pass photons with his transition energy. The output of spectrometer 239 is then collected by lens 241 and directed into first output cable 243.

If dichoric mirror 235 is configured to reflect photons having an energy close to that of the desired single exciton transition, then the mirror passes photons having an energy close to the bi-exciton transition. These photons are collected by lens 245 and directed onto spectrometer 247. Spectrometer 247 is then configured to only pass photons having an energy equal to that of the desired bi-exciton transition. The photons are then collected by lens 249 and directed into second output cable 251. Therefore, as the emission from just one dot can be collected, one photon from an entangled photon pair can be sent down first output fibre 243 and the other entangled photon pair can be sent down fibre 251.

Figure 24:
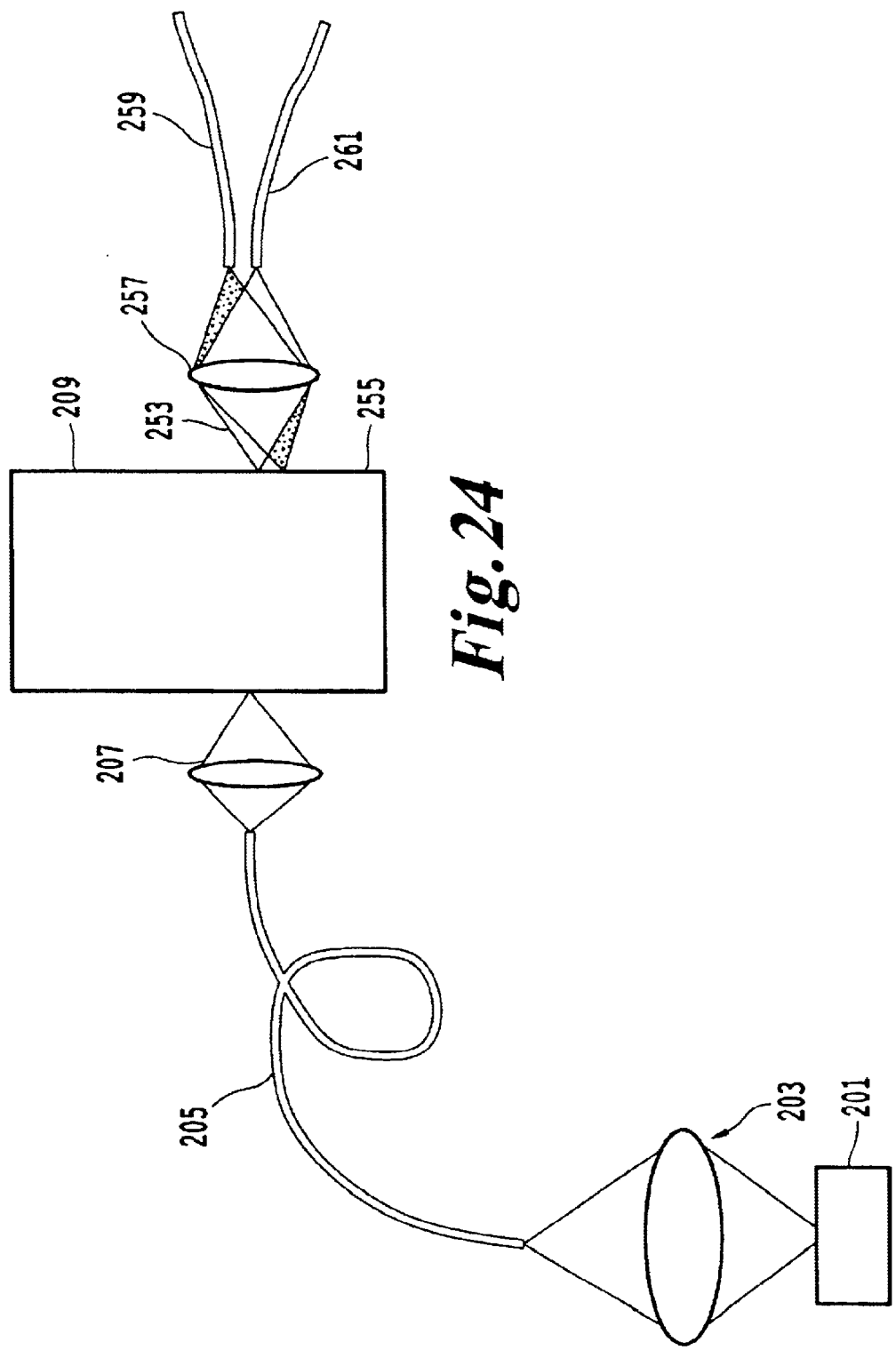
FIG. 24 illustrates a further experimental arrangement for obtaining an entangled photon pair using a source in accordance with any of the above embodiments.

FIG. 24 shows a further variation on the apparatus of FIG. 22 for collecting photons from an entangled photon pair and splitting the pair such that one photon is directed down one fibre and the other photon of the pair is directed down another fibre.

The photons are collected and directed into spectrometer 209 in the same manner as described with reference to FIG. 22. Like reference numerals are used to denote like features. The spectrometer is configured to pass photons arising from the bi-exciton transition and the single exciton transition of the same quantum dot. In FIG. 22, the spectrometer has a single output and both photons were emitted through this output. In the spectrometer 209, both photons are emitted through separate outputs 253 and 255 due to the dispersion of the gating.

The photons from both outputs are collected by lens 257. Lens 257 is capable of directing photons into either a first output fibre 259 or a second output fibre 261. Which fibre is selected is dependent on the incident angle of the photons on lens 257. Therefore, photons emitted through a spectrometer output 253 can be directed into output fibre 261 and photons emitted through spectrometer output 255 can be directed into output fibre 259.

Figure 25:
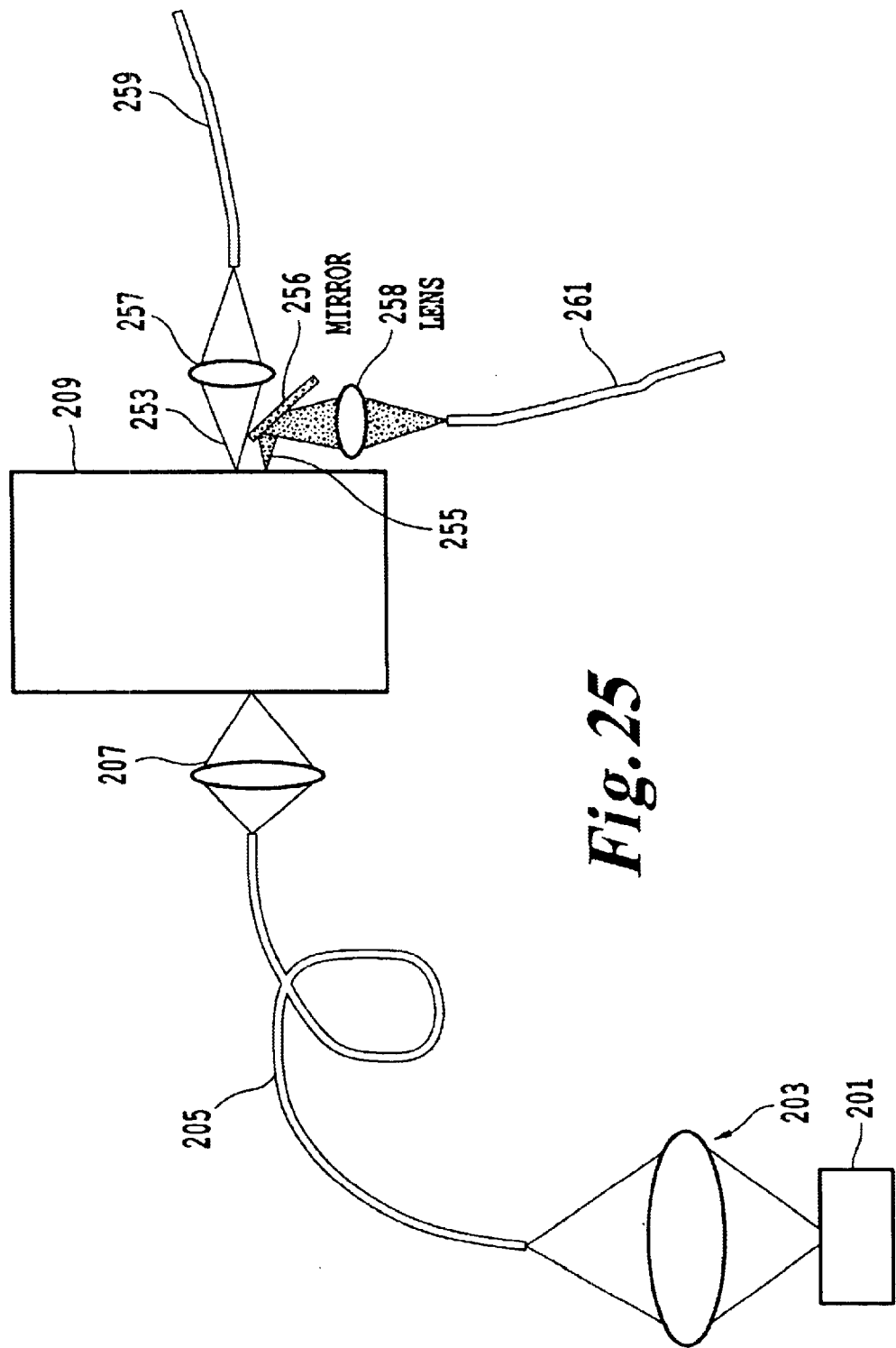
FIG. 25 illustrates a further experimental arrangement for obtaining and separating an entangled photon pair using a source in accordance with any of the above embodiments.

FIG. 25 shows a variation on the apparatus of FIG. 24. The apparatus is the same as that of FIG. 24 up to spectrometer 209. In the same manner as FIG. 24, photons with one energy are emitted through output 253 and photons having a second energy are emitted through output 255. Photons emitted through output 255 are reflected by mirror 256 and are then collected by lens 258. Lens 258 directs the reflected photons into fibre 261. Photons from output 253 are directed into fibre 259 by lens 257 as described with reference to FIG. 24.

The use of an optical cavity to separate the emission from the two photons in the entangled photon pair was previously described with reference to FIG. 8. Here, it is described that the first photon is coupled to the cavity mode and is emitted normal to the cavity, the second photon is emitted along the sides of the cone, the cone having an azimuthal angle of about 10°. FIG. 26 illustrates how these emissions may be collected. Component 301 is a photon source which has an optical cavity, for example, any of the sources described with reference to FIGS. 8 to 14. The optical cavity is designed such that the first photons couple to the resonant mode of the cavity. These photons are emitted normal to the cavity along optical path 303 through collimator lens 305 and are reflected off selective reflector 307. Selective reflector 307 comprises a circular reflecting portion 309. The selective reflector 307 is positioned so that circular reflecting portion 309 reflects only photons emitted normal to photon source 301 into first fibre optic cable 309.

The second photons do not couple to the optical mode and are emitted at a predetermined angle α. Specifically, photons are emitted along the sides of a cone, the half apex angle of the cone being α. These photons are thus emitted down this second optical path 311 and are collimated by lens 305 and directed to mask 313 is provided. Mask 313 has a transmissive ring 315. Mask 313 is positioned such that photons emitted with azimuthal angle α are transmitted through transmissive ring 315, all other photons are blocked. These transmitted photons are then focused using lens 317 into second fibre optic cable 319.

What is claimed is:

1. A photon source for emitting entangled photons, the photon source comprising:
    a photon source body comprising at least one quantum dot having a non-degenerate exciton level;
    exciton creation means for creating a biexciton or higher order exciton within the at least one quantum dot; and
    a first means configured to make said non-degenerate exciton level degenerate.

2. The photon source of claim 1, wherein said first means comprises at least one electrical contact configured to apply an electric field to said photon source and to make said non-degenerate exciton level degenerate.

3. The photon source of claim 2, wherein said at least one quantum dot is provided within a layer and said at least one electrical contact is configured to apply said electric field within the plane of the layer.

4. The photon source of claim 2, wherein said at least one quantum dot is provided within a layer and said at least one electrical contact is configured to apply said electric field perpendicular to the plane of the layer.

5. The photon source of claim 2, wherein said at least one electrical contact is configured to tune the electric field in any direction within a plane.

6. The photon source of claim 2 comprising 3 pairs of electrical contacts, arranged so as to apply the electric field in any selected direction.

7. The photon source of claim 6, wherein said 3 pairs of electrical contacts are configured to tune the electric field in any direction within a three dimensional volume.

8. The photon source of claim 1, wherein said quantum dot has a non-degenerate exciton level, said source further comprising a source of magnetic field configured to apply a magnetic field to said at least one quantum dot to take said non-degenerate exciton level degenerate.

9. The photon source of claim 8, wherein said at least one quantum dot is provided in a quantum dot layer and said source of magnetic field is configured to apply a magnetic field perpendicular to the plane of the said layer.

10. The photon source of claim 9, wherein said source of magnetic field comprises a solenoid, said quantum dot layer being provided within said solenoid and arranged substantially perpendicular to the axis of said solenoid.

11. The photon source of claim 8, wherein said at least one quantum dot is provided in a quantum dot layer and said source of magnetic field is configured to apply a magnetic field parallel to the plane of the layers.

12. The photon source of claim 11, wherein said source of magnetic field comprises a pair of spaced apart solenoids, said quantum dot layer being provided between said solenoids and oriented substantially parallel to the axes of the solenoids.

13. The photon source of claim 8, wherein said first means comprises a conducting or superconducting track provided on or within said photon source body or an electromagnet.

14. The photon source of claim 1, wherein said quantum dot has a non-degenerate exciton level, said source further comprising means to vary the temperature of said photon source to make said non-degenerate exciton level degenerate.

15. The photon source of claim 1, wherein said quantum dot has a non-degenerate exciton level, said source further comprising means to vary pressure applied to said photon source body to make said non-degenerate exciton level degenerate.

16. The photon source of claim 15, wherein the at least one quantum dot is provided in quantum dot layer and said means to vary pressure is configured to apply strain in the plane of the quantum dot layer.

17. The photon source of claim 1, wherein said exciton creation means comprises incident radiation to irradiate said photon source to provide optically excited carriers to said at least one quantum dot.

18. The photon source of claim 1, wherein said exciton means comprises means to electrically inject carriers into said at least one quantum dot.

19. The photon source of claim 1, further comprising a filter configured to filter unwanted emissions from said photon source body.

20. The photon source of claim 19, wherein said filter comprises an optical cavity.

21. The photon source of claim 20, wherein optical confinement in two dimensions is provided by a photonic band gap structure.

22. The photon source of claim 1, further comprising separating means for directing one photon of an entangled photon pair in a first direction and the other photon from the entangled photon pair in a second direction.

23. The photon source of claim 1, wherein said source comprises an optical cavity, configured to emit one photon of an entangled photon pair from said photon source body in a first optical mode and said other photon of the entangled photon pair in a second optical mode.

* * * * *